US008774558B2

(12) United States Patent
Zhang et al.

(10) Patent No.: US 8,774,558 B2
(45) Date of Patent: *Jul. 8, 2014

(54) RECTIFICATION OF CHARACTERS AND TEXT AS TRANSFORM INVARIANT LOW-RANK TEXTURES

(75) Inventors: Xin Zhang, Beijing (CN); Zhengdong Zhang, Beijing (CN); Xiao Liang, Beijing (CN); Zhouchen Lin, Beijing (CN); Yi Ma, Beijing (CN)

(73) Assignee: Microsoft Corporation, Redmond, WA (US)

(*) Notice: Subject to any disclaimer, the term of this patent is extended or adjusted under 35 U.S.C. 154(b) by 220 days.

This patent is subject to a terminal disclaimer.

(21) Appl. No.: 13/310,730

(22) Filed: Dec. 3, 2011

(65) Prior Publication Data

US 2012/0134588 A1    May 31, 2012

Related U.S. Application Data

(63) Continuation-in-part of application No. 12/955,734, filed on Nov. 29, 2010, now Pat. No. 8,463,073.

(51) Int. Cl.
*G06K 9/36* (2006.01)
*G06K 9/32* (2006.01)

(52) U.S. Cl.
CPC .................... *G06K 9/3275* (2013.01)
USPC ........................................................ 382/290

(58) Field of Classification Search
CPC ................. H04N 1/00721; G06K 9/3275
See application file for complete search history.

(56) References Cited

U.S. PATENT DOCUMENTS

| | | | |
|---|---|---|---|
| 6,519,362 B1 * | 2/2003 | Cusmariu | 382/176 |
| 7,050,085 B1 | 5/2006 | Park et al. | |
| 7,224,357 B2 | 5/2007 | Chen et al. | |
| 7,333,676 B2 | 2/2008 | Myers et al. | |
| 8,463,073 B2 * | 6/2013 | Ma et al. | 382/289 |
| 2005/0128197 A1 | 6/2005 | Thrun et al. | |
| 2005/0285872 A1 | 12/2005 | Wang et al. | |
| 2008/0260256 A1 | 10/2008 | Zeng et al. | |
| 2009/0016606 A1 * | 1/2009 | Meyer et al. | 382/176 |
| 2009/0046932 A1 | 2/2009 | Francos et al. | |
| 2011/0064302 A1 | 3/2011 | Ma et al. | |
| 2011/0311121 A1 | 12/2011 | Zhang et al. | |

OTHER PUBLICATIONS

Peng et al., "RASL: Robust Alignment by Sparse and Low-rank Decomposition for Linearity Correlated Images," CVPR 2010, Jun. 13-18, 2010.*

(Continued)

*Primary Examiner* — Bhavesh Mehta
*Assistant Examiner* — Andrew Moyer
(74) *Attorney, Agent, or Firm* — Carole Boelitz; Micky Minhas

(57) ABSTRACT

A "Text Rectifier" provides various techniques for processing selected regions of an image containing text or characters by treating those images as matrices of low-rank textures and using a rank minimization technique that recovers and removes image deformations (e.g., affine and projective transforms as well as general classes of nonlinear transforms) while rectifying the text or characters in the image region. Once distortions have been removed and the text or characters rectified, the resulting text is made available for a variety of uses or further processing such as optical character recognition (OCR). In various embodiments, binarization and/or inversion techniques are applied to the selected image regions during the rank minimization process to both improve text rectification and to present the resulting images of text to an OCR engine in a form that enhances the accuracy of the OCR results.

20 Claims, 11 Drawing Sheets

Exemplary images (*D*) of distorted text having distortion (τ) and resulting rectified image (*D* ∘ τ) of the text following processing by the Text Rectifier, also showing low rank (*A*) and sparse error component (*E*) of the rectified image, where *D* ∘ τ = *A* + *E*

(56) References Cited

OTHER PUBLICATIONS

Grother, Patrick J. "NIST special database 19 handprinted forms and characters database." National Institute of Standards and Technology (1995).*

Jung, Keechul, Kwang in Kim, and Anil K Jain. "Text information extraction in images and video: a survey." Pattern recognition 37.5 (2004): 977-997.*

Zhang et al., "TILT: Transform Invariant Low-rank Textures," arXiv:1012.3216, posted on arxiv.org on Dec. 15, 2010.*

Iwamura, et al., "Layout-Free Dewarping of Planar Document Images", DRR XVI, vol. 7247, No. 36, Jan. 2009, pp. 1-10.

Li, et al., "Character Recognition under Severe Perspective Distortion", Proceedings of the 19th International Conference on Pattern Recognition (ICPR), Dec. 8-11, 2008, pp. 4.

Iwamura, et al., "Rectifying Perspective Distortion into Affine Distortion Using Variants and Invariants", Proceedings of the Second International Workshop on Camera-Based Document Analysis and Recognition (CBDAR), Sep. 2007, pp. 138-145.

Myers, et al., "Rectification and Recognition of text in 3-D Scenes", International Journal on Document Analysis and Recognition, vol. 7, No. 2-3, Jul. 2005, pp. 1-36.

Liang, et al., "Geometric Rectification of Camera-captured Document Images", IEEE Transactions on Pattern Analysis and Machine Intelligences, vol. 30, No. 4, Apr. 2008, pp. 591-605.

Lin, et al., "The Augmented Lagrange Multiplier Method for Exact Recovery of Corrupted Low-rank Matrices", UIUC Technical Report UILU-ENG-09-2215, 2009, pp. 1-20.

Mori, et al., "Historical Review of OCR Research and Development", IEEE, vol. 80, No. 7, 1992, pp. 1029-1058.

Yuan, et al., "Convex Hull based Skew Estimation", The Journal of The Pattern Recognition Society, vol. 40, No. 2, Feb. 1, 2006, pp. 456-475.

E. Candès and X. Li and Yi Ma and J. Wright. Robust Principal Component Analysis?. Technical Report No. 2009-13, Dec. 2009, Department of Statistics, Stanford University.

K. Fujimoto and J. Sun and H. Takebe and M. Suwa and S. Naoi. Curved Paper Rectification for Digital Camera Document Images by Shape from Parallel Geodesics using Continuous Dynamic Programming. Proc. of International Conference on Document Analysis and Recognition, 2007.

W. Hong and Y. Yang and Yi Ma. On Symmetry and Multiple View Geometry: Structure, Pose and Calibration from a Single Image,. IJCV, 60(3):241-265, 2004.

K. Ikeuchi. Shape from regular patterns. Artificial Intelligence, 22:49-75, 1984.

K. Ikeuchi and B. Horn. Numerical shape from shading and occluding boundaries. Artificial Intelligence, 17:141-184, 1981.

H. Koo and N. Cho. Rectification of Figures and Photos in Document Images using Bounding Box Interface. CVPR, 2010.

M. Park and K. Brocklehurst and R. Collins and Y. Liu. Translation-Symmetry-based Perceptual Grouping with Applications to Urban Scenes. ACCV, 2010.

M. Park and K. Brocklehurst and R. T. Collins and Y. Liu. Deformed Lattice Detection in Real-World Images Using Mean-Shift Belief Propagation. TPAMI, 31:1804-1816, 2009.

M. Salzmann and R. Hartley and P. Fua. Convex Optimization for Deformable Surface 3-D Tracking. ICCV, 2007.

Y. Tian and S. Narasimhan. A Globally Optimal Data-Driven Approach for Image Distortion Estimation. CVPR, 2010.

J. Liang, D. DeMenthon, and D. Doermann. Geometric rectification of camera-captured document images. IEEE Trans. Pattern Analysis and Machine Intelligence, 30(4):591-605, 2008.

M. Pastor, A. Toselli, and E. Vidal. Projection profile based algorithm for slant removal. Image Analysis and Understanding (Lecture Notes in Computer Science), 3212:183-190, 2004.

C. Singha, N. Bhatiab, and A. Kaur. Hough transform based fast skew detection and accurate skew correction methods. Pattern Recognition, 14(12):3528-3546, 2008.

H. Yan. Skew correction of document images using interline cross-correlation. CVGIP: Graphical Models and Image Processing, 55(6):538-543, 1993.

Huang, J., X. Huang, D. N. Metaxas, Simultaneous image transformation and sparse representation recovery, IEEE Comp. Soc. Conf. on Comp. Vision and Pattern Recognition, CVPR 2008, Jun. 24-26, 2008, pp. 1-8, Anchorage, Alaska, USA.

Yang, J., J. Wright, T. S. Huang, Y. Ma, Image super-resolution as sparse representation of raw image patches, IEEE Comp. Soc. Conf. on Comp. Vision and Pattern Recognition, CVPR 2008, Jun. 24-26, 2008, pp. 1-8, Anchorage, Alaska, USA.

Moyer, A., Notice of Allowance, U.S. Appl. No. 12/955,734, filed Feb. 13, 2013.

Peng, Y., A. Ganesh, J. Wright, W. Xu, Y. Ma, RASL: Robust alignment by sparse and low-rank decomposition for linearly correlated images, The Twenty-Third IEEE Conf. on Comp. Vision and Pattern Recognition, CVPR 2010, Jun. 13-18, 2010, pp. 763-770, San Francisco, CA, USA.

Capel, D. P., A. Zisserman, Automated mosaicing with super-resolution zoom, 1998 Conf. on Comp. Vision and Pattern Recognition, CVPR 1998, Jun. 23-25, 1998, pp. 885-891, Santa Barbara, CA, USA.

Hartley, R. I., Self-calibration from multiple views with a rotating camera, Proc. of the Third European Conf. on Comp. Vision, May 2-6, 1994, pp. 471-478, vol. 1, Stockholm, Sweden.

Moyer, Andrew M, Office Action, U.S. Appl. No. 12/955,734, Sep. 27, 2012.

Sturm, P. F., S. J. Maybank, On plane-based camera calibration: A general algorithm, singularities, applications, 1999 Conf. on Comp. Vision and Pattern Recognition (CVPR '99), Jun. 23-25, 1999, pp. 1432-1437, Ft. Collins, CO, USA.

Zhang, Z., A flexible new technique for camera calibration, IEEE Trans. Pattern Anal. Mach. Intell., Jan. 2000, vol. 22, No. 11, pp. 1330-1334.

Moyer, Andrew M., U.S. Office Action, U.S. Appl. No. 13/310,729, Sep. 13, 2013, pp. 30.

* cited by examiner

Example of a Generalized Cylindrical Surface (i.e., Concave Curved Building Facade) Viewed by a Perspective Camera with an Inserted Image Transformed to Correspond to the Geometry of the Building Facade (see Section 3.4.2)

RECTIFICATION OF CHARACTERS AND TEXT AS TRANSFORM INVARIANT LOW-RANK TEXTURES

CROSS-REFERENCE TO RELATED APPLICATIONS

This application is a continuation-in-part of U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference.

BACKGROUND

1. Technical Field

A "Text Rectifier," as described herein, processes selected regions of an image containing text or characters by treating those selected image regions as matrices of low-rank textures and using a rank minimization technique that recovers and removes image deformations while rectifying the text or characters in the selected image regions.

2. Background Art

Optical character recognition (OCR) has been one of the most successful applications of pattern recognition. The techniques and technologies for OCR have become fairly mature in the past decade or so and for many languages the text recognition accuracy rates of many commercial OCR software products are generally in the high $90^{th}$ percentile. Such software products are widely available in a large variety of applications for use with various computing platforms.

One of the main limitations of current OCR technology is that its recognition performance is rather sensitive to deformation in the input characters. That is, such applications tend to perform well when the characters are presented in their standard upright position, at which most OCR engines were trained. Most widely used commercial OCR systems can tolerate only very small rotations and skews in the input characters. For example, two of the most popular OCR systems generally perform well up to about 5 degrees of rotation and up to a skew value of about 0.1. In fact, when there are merely 20 degrees of rotation or a skew value of 0.3, the recognition rates of such systems have been demonstrated to degrade rapidly from high $90^{th}$ percentile to below 10 percent accuracy.

Consequently, typical OCR techniques are known to perform more poorly as the distortion of the text increases. Unfortunately, this is a common problem even for the conventional use of OCR in digitizing books or documents, where the scanned texts can be significantly warped if the page is not purely flat or upright. In the computer vision and pattern recognition literature, there have been many techniques developed in the past to preprocess and rectify such distorted text documents. However, most of these techniques rely on a global regular layout of the texts to rectify the distortion. That is, the rectified texts are expected to lie on a set of several (or many) horizontal, parallel lines, often in a rectangular region. Hence, many different methods have been developed to estimate the rotation or skew angle based on statistics of the distorted text compared to the standard layout, including methods based on projection profiles, Hough transform for gradient/edge directions, morphology of the text region, cross-correlation of image blocks, etc. Unfortunately, real-world images of text are not always provided in such neat rectangular regions.

For example, as smart mobile phones, media players, handheld computing devices, etc., have become increasingly popular, embedded digital cameras in such devices are increasingly used to capture images containing text. Such images are generally captured from a widely varying viewpoints and angles. Consequently, recognizing text in such images (e.g., street signs, restaurant menus, license plates on cars, etc., often pose challenges for OCR applications since such images contain very few characters or words (i.e., not enough to estimate orientation from multiple parallel rows of text) and are often taken from an oblique viewing angle. Consequently, existing techniques adapted to rectifying large regions of text (e.g., a paragraph or a page) of rich texts, often have difficulty in working at the level of an individual character or with a short phrase or word. Consequently, the inability to rectify small amounts of text or characters degrades subsequent OCR accuracy results with respect to that text or characters.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Text Rectifier," as described herein, provides various techniques for processing regions of an image containing text or characters by treating those images as matrices of low-rank textures and using a rank minimization technique that recovers and removes image deformations relative to an arbitrary, but automatically determinable, camera viewpoint while rectifying the text or characters in the image region. In other words, the Text Rectifier uses rank-minimization techniques to determine and remove affine and projective transforms (and other general classes of nonlinear transforms) from images of text, while rectifying that text. The rectified text is then made available for a variety of uses or further processing such as optical character recognition (OCR). In various embodiments, binarization and/or inversion techniques are applied to the selected image regions during the rank minimization process to both improve text rectification and to present the resulting images of text to an OCR engine in a form that enhances the accuracy of the OCR results.

To remove the distortions or deformations and to rectify the text, the Text Rectifier adapts a "Transform Invariant Low-Rank Texture" (TILT) extraction process that, when applied to a selected region of an image, recovers and removes image deformations while rectifying the text in the selected image region. Note that the TILT process is described in detail in co-pending U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference.

The TILT process described in co-pending U.S. patent application Ser. No. 12/955,734 provides various techniques for efficiently and effectively extracting a rich class of low-rank textures representing regions of a 3D scene from 2D images of the scene despite significant and concurrent domain transforms. Examples of such domain transforms include, but are not limited to, translation, rotation, reflection, skew, scale, etc. The low-rank textures provided by the TILT process are useful for capturing geometrically meaningful structures in an image, which encompass conventional local features such as edges and corners as well as all kinds of approximately regular or approximately symmetric patterns, ubiquitous in urban environments and with other natural or man-made objects.

More specifically, the TILT process is capable of finding and extracting low-rank textures by adapting convex optimization techniques that enable robust recovery of a high-dimensional low-rank matrix despite gross sparse errors using the image processing techniques described herein. By adapting these matrix optimization techniques to the image processing techniques described herein, even for image regions having significant projective deformations, the TILT process is capable of accurately recovering intrinsic low-rank textures and the precise domain transforms from a single image, or from selected regions of that image. The TILT process directly applies to image regions of arbitrary sizes where there are certain approximately regular structures, even in the case of significant transforms, image corruption, noise, and partial occlusions. By applying the TILT extraction techniques to images of text or characters, the Text Rectifier provides images of text or characters that are well adapted to improve the results of existing OCR engines.

In view of the above summary, it is clear that the Text Rectifier described herein provides various techniques for processing regions of an image containing text or characters by treating those images as matrices of low-rank textures and using a rank minimization technique that recovers and removes image deformations while rectifying the text or characters in the selected image region. In addition to the just described benefits, other advantages of the Text Rectifier will become apparent from the detailed description that follows hereinafter when taken in conjunction with the accompanying drawing figures.

DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Text Rectifier," as described herein, provides various techniques for processing selected regions of an image containing text or characters by treating those images as matrices of low-rank textures and using a rank minimization technique that recovers and removes image deformations while rectifying the text or characters in the selected image region to a typical upright position or orientation (i.e., the position in which text is normally intended to be read). Note that this typical upright position is also the orientation in which text is most frequently presented to an OCR engine or the like. The Text Rectifier can effectively rectify texts at all scale levels including individual characters, short phrases, large paragraphs, etc. Although many characters or words do not have dominant horizontal or vertical edges, the robust rank of a character image, viewed as a matrix, is a good indicator of a characters standard upright position. Consequently, regardless of the orientation, rotation, skew, etc. of an image, the Text Rectifier is capable of removing such distortions and rectifying the text.

Figure 1:
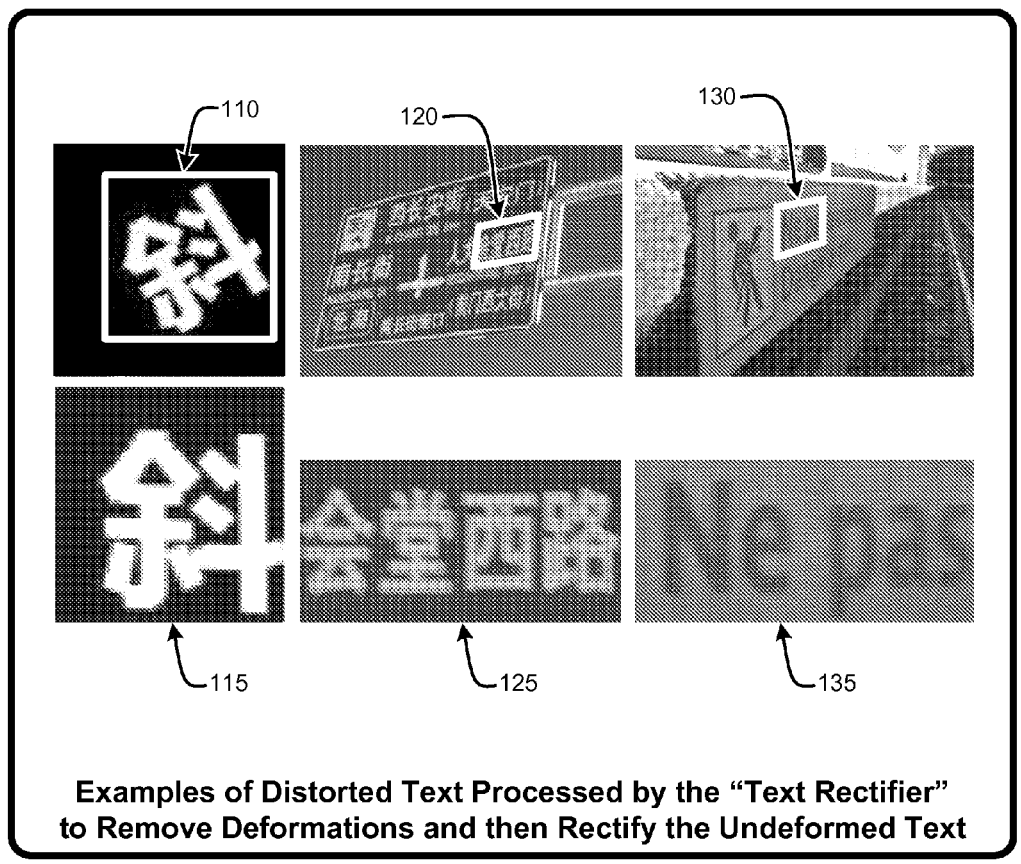
FIG. 1 illustrates an example of distorted text processed by a "Text Rectifier" to remove deformations and then rectify the resulting undeformed text, as described herein.

For example, FIG. 1 provides an example of distorted text processed by the "Text Rectifier" to remove deformations and then rectify the undeformed text. The first row of images (110, 120 and 130) are selected regions of distorted text, and the second row of images (115, 125, and 135, respectively) are the corresponding undeformed and rectified images of the selected regions of text following processing by the Text Rectifier. Once distortions have been removed and the text or characters rectified, the resulting text is made available for a variety of uses or further processing such as optical character recognition (OCR). In various embodiments, binarization and/or inversion techniques are applied to the selected image regions during the rank minimization process to both improve text rectification and to present the resulting images of text to an OCR engine in a form that enhances the accuracy of the OCR results.

More specifically, the Text Rectifier removes image deformations (e.g., affine and projective transforms as well as general classes of nonlinear transforms) relative to an arbitrary, but automatically determinable, camera viewpoint (or viewing direction) while rectifying the text or characters in the selected image region. To remove the distortions or deformations and to rectify the text, the Text Rectifier adapts a "Transform Invariant Low-Rank Texture" (TILT) extraction process that, when applied to a selected region of an image, recovers and removes image deformations while rectifying the text in the selected image region. Note that the TILT process is described in detail in co-pending U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference. Further, it should be noted that further extensions to the TILT process for dealing with curved surfaces are described in Section 3. These extensions to the TILT process are generally referred to herein as the "modified TILT process".

Note also that the following discussion generally refers to selected regions as being generally "rectangular". It should be noted that this "rectangular" region can be an irregular trapezoidal region that differs substantially from an ideal rectangle without adversely affecting the performance of the TILT process or of the modified TILT process. In fact, the selected regions can be of any desired shape or size. However, for ease of use, in various embodiments, the user is provided with the capability to specify generally rectangular regions. Thus, for purposes of discussion, this document will generally refer to the region selected for processing as being generally rectangular in nature, though again, any shape can be used to select or specify that region.

The aforementioned TILT process, as summarized below in Section 2.1, generally provides various techniques for efficiently and effectively extracting a rich class of low-rank textures representing regions of a 3D scene from 2D images of the scene despite significant and concurrent domain transforms. Examples of such domain transforms include, but are not limited to, translation, rotation, reflection, skew, scale, etc. The low-rank textures provided by the TILT process are useful for capturing geometrically meaningful structures in an image, which encompass conventional local features such as edges and corners as well as all kinds of approximately regular or approximately symmetric patterns, ubiquitous in urban environments and with other natural or man-made objects.

However, a straightforward application of TILT to text images has been observed to properly rectify some but not all images of individual characters. Therefore, in various embodiments, the Text Rectifier further modifies the TILT process described in co-pending U.S. patent application Ser. No. 12/955,734 by binarizing and optionally inverting the selected image regions containing text images so that the characters are of value one (white) and the background is of value zero (black). Such preprocessing has been observed to significantly enhance the text rectification performance of TILT, and thus the Text Rectifier, especially in cases of single characters, thereby allowing the Text Rectifier to work effectively on most individual characters in addition to larger text strings. Note also that binarization and inversion provides the added benefit of improving OCR performance when the output of the Text Rectifier is provided to an OCR engine.

Figure 2:
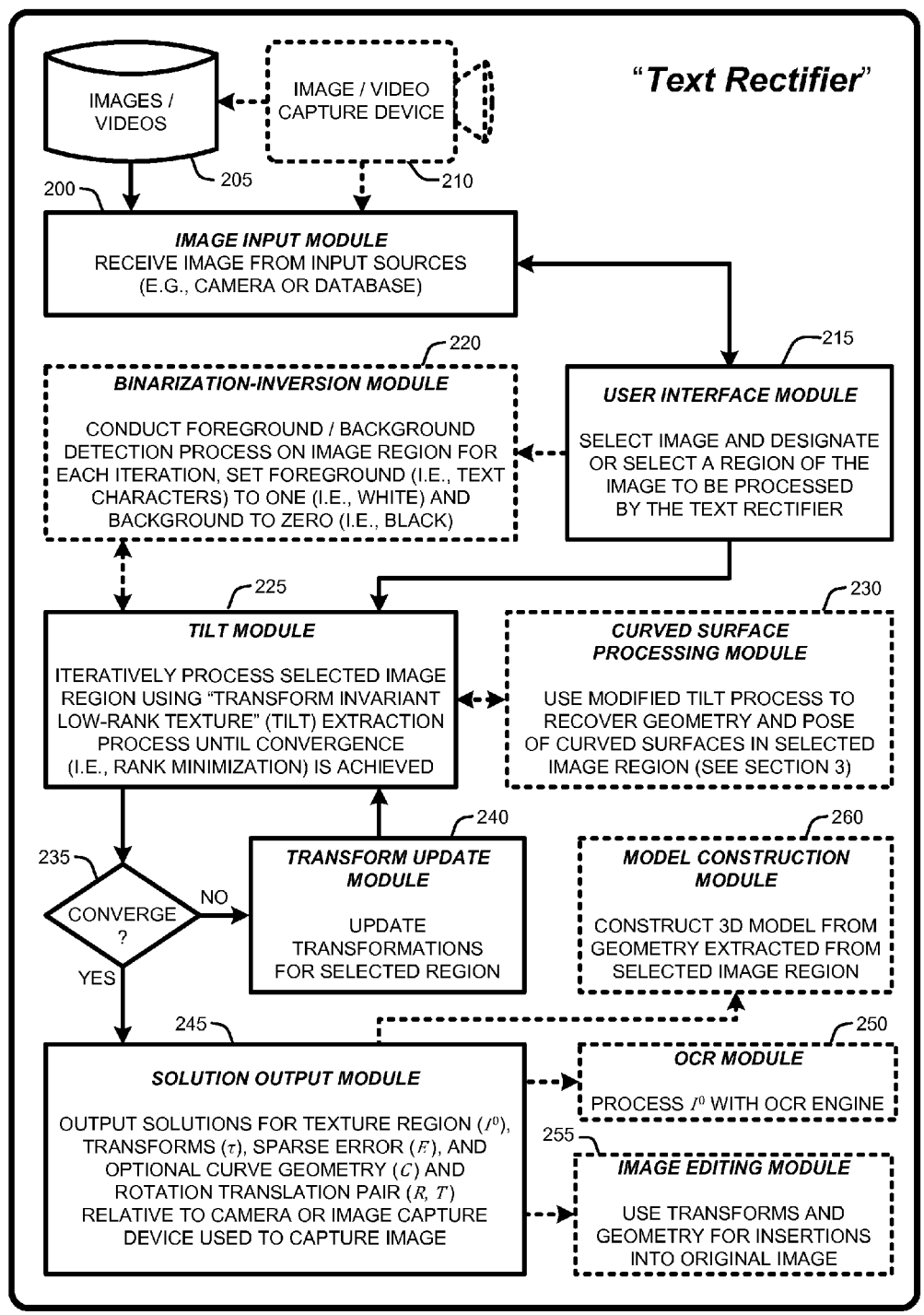
FIG. 2 provides an exemplary architectural flow diagram that illustrates program modules for implementing various embodiments of the Text Rectifier, as described herein.

1.1 System Overview:

As noted above, the "Text Rectifier," provides various techniques for processing regions of an image containing text or characters by treating those images as matrices of low-rank textures and using a rank minimization technique that recovers and removes image deformations while rectifying the text or characters in the selected image region. The processes summarized above are illustrated by the general system diagram of FIG. 2. In particular, the system diagram of FIG. 2 illustrates the interrelationships between program modules for implementing various embodiments of the Text Rectifier, as described herein. Furthermore, while the system diagram of FIG. 2 illustrates a high-level view of various embodiments of the Text Rectifier, FIG. 2 is not intended to provide an exhaustive or complete illustration of every possible embodiment of the Text Rectifier as described throughout this document.

In addition, it should be noted that any boxes and interconnections between boxes that may be represented by broken or dashed lines in FIG. 2 represent alternate embodiments of the Text Rectifier described herein, and that any or all of these alternate embodiments, as described below, may be used in combination with other alternate embodiments that are described throughout this document.

In general, as illustrated by FIG. 2, the processes enabled by the Text Rectifier begin operation by using an image input module 200 to receive an image or video 205. The image or video 205 is either pre-recorded, or is recorded or captured using a conventional image or video capture device 210. Note also that a user interface module 215 can be used to select from a library or list of the images or videos 205 or to select an image input from the image or video capture device 210. In addition, the user interface module 215 is used to designate or select the region of the image that is to be processed by the Text Rectifier.

Once the image has been selected and the region of the image to be processed has been selected or otherwise specified, the image is provided to a TILT module 225, or optionally to a binarization-inversion module 220 for preprocessing before being provided to the TILT module. In general, the TILT module 225 iteratively processes the selected image region using the transform invariant low-rank texture (TILT) extraction process discussed in Section 2.1 to perform an iterative convex optimization process that loops until convergence (235) to a low-rank solution (i.e., rank minimization). As discussed in detail throughout Section 2 of this document, the low-rank solution includes texture regions)($I^0$), associated transforms ($\tau$), and a corresponding sparse error (E).

As discussed in Section 2.4, an optional binarization-inversion module 220 enhances rectification of text in the selected image region by preprocessing the selected image region prior to each iteration of the TILT module 225. In general, the binarization-inversion module 220 conducts a foreground-background detection process on the selected image region prior to each iteration of processing by the TILT module 225. The binarization-inversion module 220 then makes the selected region into a binary image by setting the foreground region (corresponding to the text characters) to a value of one (i.e., text is set to white color), while setting the background region to a value of zero (i.e., background is set black). The result of this binarization process is that the selected image region will include white text on a black background. As discussed in Section 2.4, this binary format for the selected input region has been observed to provide improved rectification results for the text.

Further, in the case of images of curved geometric surfaces (see Section 3.0), a curved surface processing module 230 uses a modified TILT process to recover the geometry and pose of the curved surface in the selected image region. Consequently, given a curved surface in the selected image region, the low-rank solution (i.e., $I^0$, $\tau$, and E) optionally includes the 3D curve geometry (C) and a corresponding rotation-translation pair (R,T) for the curved surface relative to the camera or image capture device used to capture the image.

Regardless of whether the binarization-inversion module 220 and/or the curved surface processing module 230 is used, following the processing of each iteration performed by the TILT module 225, the Text Rectifier checks for convergence (235) of the low-rank solution. If convergence (235) has not been reached, a transform update module 240 updates or otherwise stores the transforms (and corresponding low-rank solution information) for use in the next processing iteration of the TILT module 225.

Once convergence (235) is reached, a solution output module 245 outputs the optimized solutions for texture regions ($I^0$), associated geometric information (i.e., transforms, $\tau$, with optional 3D curve geometry (C) and optional corresponding rotation-translation pair (R,T)), and sparse errors (E). These solutions are then provided for use in any of a large number of image processing applications.

For example, in the case that the selected image region includes text, the output $I^0$ will contain a rectified and transformed image of that text that is suitable for input directly to an OCR engine. In such cases, an OCR module 250 simply processes $I^0$ to generate a text output from the transformed and rectified image of the text in the selected region.

Another example of the use of the optimized solutions provided by the solution output module 245 includes the use of an image editing module 255 that uses the transforms and optional 3D geometry extracted from the input image (or selected image region) to apply an inverse transform and inverse geometry to images of objects and/or text that can then be inserted or pasted back into the original image (or selected image region) to construct a photorealistic edited version of the original image. This concept is discussed in further detail in Section 3.4.2 with respect to FIG. 9.

Yet another example of the use of the optimized solutions provided by the solution output module 245 includes the use of a model construction module 260 that uses the geometric information for curved surfaces (i.e., the optional 3D curve geometry (C) and a corresponding rotation-translation pair (R,T)), to construct a 3D model of an object in the image based on the geometry extracted from the selected image region. Note that by selecting multiple images or image regions for processing by the TILT module 225 (and optional processing by the curved surface processing module 230), the 3D geometry extracted by the modified TILT process can be combined and used to construct extensive 3D models of urban regions or other scenes. See Section 3.4.1 for additional details of this concept.

2.0 Operational Details of the Text Rectifier:

The above-described program modules are employed for implementing various embodiments of the Text Rectifier. As summarized above, the Text Rectifier provides various techniques for processing selected regions of an image containing text or characters by treating those selected image regions as matrices of low-rank textures and using a rank minimization technique that recovers and removes image deformations while rectifying the text or characters in the selected image region. The following sections provide a detailed discussion of the operation of various embodiments of the Text Rectifier, and of exemplary methods for implementing the program modules described in Section 1 with respect to FIG. 1 and FIG. 2.

In particular, the following sections provides examples and operational details of various embodiments of the Text Rectifier, including: an overview of Transform Invariant Low-Rank Texture (TILT) extraction; character rectification as low-rank textures; joint rectification of multiple characters; and optional enhancements to the performance of TILT for character rectification. Note also that further extensions to the TILT process and the Text Rectifier for unwrapping low-rank textures on curved surfaces is described in Section 3.

Note that the following paragraphs generally refer to the use of Chinese characters with the processes provided by the Text Rectifier. However, it should be understood that the use of Chinese characters is provided as an example of a challenging character set that is handled well by the Text Rectifier, and that the Text Rectifier is capable of processing any conventional character set (e.g., other Asian character sets, Latin characters, Greek characters, Cyrillic characters, Hebrew characters, Arabic characters, etc.).

2.1 Transform Invariant Low-Rank Texture (TILT) Extraction:

As noted above, the Text Rectifier adapts a "Transform Invariant Low-Rank Texture" (TILT) extraction process that, when applied to selected regions of an image, recovers and removes image deformations while rectifying the text in the selected image region. Note that the TILT process is described in detail in co-pending U.S. patent application Ser. No. 12/955,734, filed on Nov. 29, 2010, by Yi Ma, et al., and entitled "ROBUST RECOVERY OF TRANSFORM INVARIANT LOW-RANK TEXTURES," the subject matter of which is incorporated herein by this reference. As such, the following paragraphs will only generally summarize the TILT process, followed by a detailed description of how that process is further adapted to enhance the removal of distortions or deformations and rectification of text in selected regions of an image. Therefore, any references to "TILT", the "TILT process" or similar terms within this document should be understood and interpreted in view of the detailed description provided by co-pending U.S. patent application Ser. No. 12/955,734.

In general, the TILT process provides various techniques for efficiently and effectively extracting a rich class of low-rank textures representing regions of a 3D scene from 2D images of the scene despite significant and concurrent domain transforms (including both affine and projective transforms). Examples of such domain transforms include, but are not limited to, translation, rotation, reflection, skew, scale, etc. The low-rank textures provided by the TILT process are useful for capturing geometrically meaningful structures in an image, which encompass conventional local features such as edges and corners as well as all kinds of approximately regular or approximately symmetric patterns, ubiquitous in urban environments and with other natural or man-made objects. Note that, as is well understood by those skilled in the art of linear algebra and matrix math, the rank of a linear map (corresponding to the output texture in this case) is the dimension of the linear map corresponding to the number of nonzero singular values of the map.

In other words, the TILT process extracts both textural and geometric information defining regions of low-rank planar patterns from 2D images of a scene. In contrast to conventional feature extraction techniques that rely on point-based features, the TILT process extracts a plurality of regions from an image and derives global correlations or transformations of those regions in 3D (e.g., transformations including translation, rotation, reflection, skew, scale, etc.) relative to an arbitrary, but automatically determinable, camera viewpoint (or viewing direction). In general, these regions are identified by processing windows of the image to identify the extracted region. In various tested embodiments, it was observed that window sizes having a minimum size of about 20×20 pixels produced good results. However, it should be understood that window size may be dependent on a number of factors, including, for example, overall image size, and the size of texture regions within the image.

More specifically, the TILT process is capable of finding and extracting low-rank textures by adapting convex optimization techniques that enable robust recovery of a high-dimensional low-rank matrix despite gross sparse errors to the image processing techniques described herein. By adapting these matrix optimization techniques to the image processing operations described herein, even for image regions having significant projective deformation, the TILT process is capable of accurately recovering intrinsic low-rank textures and the precise domain transforms from a single image, or from selected regions of that image. The TILT process directly applies to image regions of arbitrary sizes where there are certain approximately regular structures, even in the case of significant transforms, image corruption, noise, and partial occlusions.

The TILT process finds the low-rank textures in an image by conducting an effective window-based search for the actual deformation (i.e., domain transforms) of the image in order to decompose the image into a low-rank component and a sparse error component relating to image intensity (or other image color channel). The TILT process finds optimal domain transforms by minimizing the rank of an undeformed (i.e., untransformed) version of the original image subject to some sparse errors by using convex optimization techniques to recover the low-rank textures from a sparse representation of the image.

Note that large numbers of low rank textures can be extracted from a single image, such as, for example, multiple separate regions of text within an image (e.g., text on building signs and/or street signs on a street). Note also that the rectification process inherent in the texture extraction techniques described with respect to the TILT process provides a measure of the specific domain transforms (translation, rotation, reflection, skew, scale, etc.) that would be used to construct the low-rank textures identified in a particular image of a 3D scene. Consequently, the regions extracted by using the TILT process have associated geometric information that can be used to rectify those regions, or to enable a wide variety of image processing applications relative to those regions and to the input image as a whole.

Further, as noted above, extensions to the above-summarized TILT process for handing curved surfaces are described in detail in Section 3 of this document. More specifically, Section 3 describes a "modified TILT process" that adapts or modifies the original TILT process to recover the geometry and pose of curved surfaces in selected image regions. Consequently, given a curved surface, the modified TILT process will return the low-rank solution (i.e., $I^0$, $\tau$, and E) for selected image regions, as well as the 3D curve geometry (C) and a corresponding rotation-translation pair (R,T) for the curved surface relative to the camera or image capture device used to capture the image.

2.2 Character Rectification as Low-Rank Textures:

There are four popular standard fonts of Chinese characters, including: "songti", "heiti", "kaiti", and "lishu". Almost all Chinese books and street signs are printed in one of these fonts. Standard fonts of many, but not all, Chinese characters are rich in both horizontal and vertical strokes. Even for those characters that do not have dominant horizontal or vertical strokes, they are still very rich in many other types of local or global (bilateral, translational) symmetry. Hence, mathematically, if the image of a character is viewed as a matrix, the matrix will have significant correlation among its columns and rows and therefore it tends to be a very low-rank matrix. However, since many characters are not perfectly symmetric or can consist of a small number of irregular strokes, a more appropriate assumption is that the overall character image can be modeled "approximately" as a low-rank matrix after some small imperfect strokes/parts are removed from the rest. In other words, the image of a character D can be modeled as a sum of a low-rank matrix A and a sparse-error matrix E, as illustrated by Equation 1, where:

$$D = A + E. \qquad \text{Equation (1)}$$

Thus, characters are treated as robust low-rank textures. Therefore, similar to the TILT process summarized in Section 2.1, if an image contains a deformed character, the Text Rectifier recovers a deformation $\tau$ by solving the following optimization problem:

$$\min_{A,E,\tau} \|A\|_* + \lambda \|E\|_1, \text{ s.t. } D \circ \tau = A + E \qquad \text{Equation (2)}$$

where $\|\bullet\|_*$ and $\|\bullet\|_1$ are the nuclear norm (sum of all singular values) and $l_1$-norm (sum of absolute values of all entries) of a matrix, respectively, and in this context, $\tau$ typically belongs to the group of 2D affine or projective transforms. Note that for relatively small image regions, modeling $\tau$ as an affine transformation may suffice. However, for larger image regions, $\tau$ is modeled as a perspective transform. However, as noted above, $\tau$ can also be modeled using other general classes of transforms. These affine and projective cases are referred to herein as "affine TILT" and "projective TILT", respectively. Such transforms are generally sufficient for images of street views and similar pictures containing regions of text captured from arbitrary viewpoints.

Figure 3:
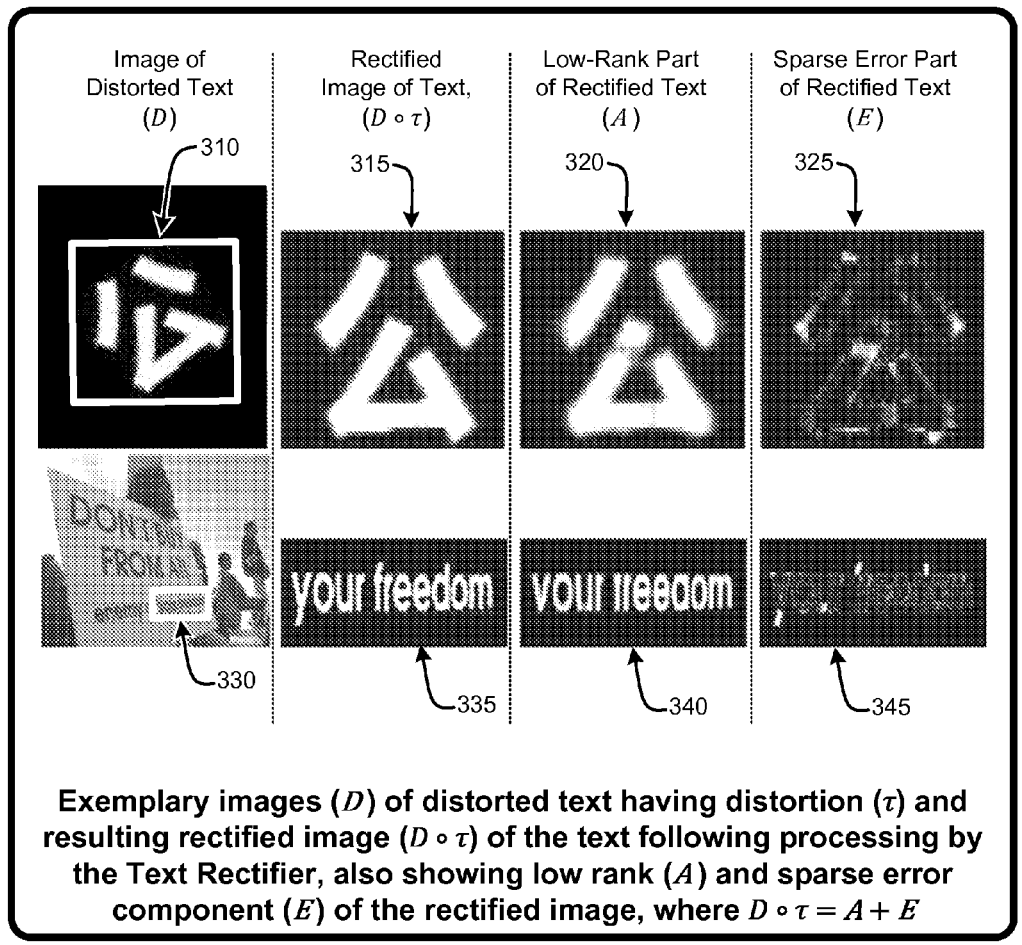
FIG. 3 provides an example illustrating the rectification of selected regions of images containing distorted or deformed regions of text using the Text Rectifier, which from left to right shows deformed text D, rectified text D∘τ, a low-rank part A, and a sparse-error part E of the rectified text, as described herein.

FIG. 3 shows a simple example for this model: The selected regions of text in each image (310 and 330, respectively) contain the initial transformed (i.e., distorted or deformed) character or text, D. These selected regions are rectified by proper transforms $\tau$ resulting in corresponding images, $D \circ \tau$ (315 and 335, respectively) which can be interpreted as the sum of a low-rank component A (320 and 340, respectively) and a sparse component E (325 and 345, respectively). However, it should be noted that more complex transforms, such as images of text on curved surfaces captured at oblique angles, can also be handled by the Text Rectifier, as discussed below in Section 3.

The optimal rectifying transform $\tau$ can be solved iteratively by computing its increments $\Delta\tau$ from the linearized version of Equation 1, as illustrated by Equation (3):

$$\min_{A,E,\Delta\tau} \|A\|_* + \lambda \|E\|_1, \text{ s.t. } D \circ \tau + J\Delta\tau = A + E, \qquad \text{Equation (3)}$$

where J is the Jacobian: derivatives of the image $D \circ \tau$ with respect to the transformation parameters, which is actually a 3D tensor. Equation (3) can be solved efficiently using techniques such as the alternating direction method (ADM), which minimizes over its augmented Lagrangian function, as shown in Equation (4), where:

$$L(A, E, \Delta\tau, Y, \mu) = \|A\|_* + \lambda \|E\|_1 + \qquad \text{Equation (4)}$$
$$\langle Y, D \circ \tau + J\Delta\tau - A - E \rangle + \frac{\mu}{2} \|D \circ \tau + J\Delta\tau - A - E\|_F^2$$

to update A, E, and Δτ alternately, where Y is the Lagrange multiplier and μ is a penalty parameter.

In general, minimizing a robust low-rank objective function helps correct the pose or orientation of text or characters because the robust low-rank objective function attains its minimum value when the character is at its upright position. One reason for this is that many characters, even if they do not have many horizontal or vertical strokes, still exhibit the most regularity in their upright or rectified position in terms of the robust rank of its image. Advantageously, this is also the case for most Chinese characters, which is one reason why Chinese character rectification is even possible.

2.3 Joint Rectification of Multiple Characters:

The processes discussed above deal primarily with rectifying a single character (for paragraphs, the words/phrases should be well aligned both horizontally and vertically such that the TILT process will generally converge on the correct rectification). However, in real-world applications (e.g., street view captured using a cell phone camera or the like), a user is often provided with an image with multiple characters on a single line, such as a short phrase on a street sign or an entry on a restaurant menu.

Although it is possible to separate the image into individual characters and apply the processes discussed above to each subimage independently (i.e., select individual image regions containing one or more characters), such a strategy has some disadvantages. First, without rectifying the deformation, it may not be easy to segment the characters accurately depending upon the image size and the tools or user interface provided to the user for selecting small image regions or subregions. Second, there may be simple characters with few strokes to provide a basis for satisfactory rectification. Rectifying such "simple" characters may not be robust enough and may lead to OCR recognition failures. Third, after independent rectification, it is nontrivial to align all the characters as the computed transforms may be somewhat different from one another.

However, if all the characters are on the same plane, it is expected that they should generally undergo the same affine or projective transform τ. Consequently, in such cases, the Text Rectifier uses a strategy of jointly rectifying all of the characters in the selected image region (see Section 3 for a discussion of how text on curved surfaces is handled by the Text Rectifier). Note that although the images of individual characters may be low-rank, the image of multiple characters on a line may no longer be low-rank anymore with respect to its lower matrix dimension. So the rank minimization objective function discussed above will not work on the joint image as robustly as on an individual character or on a paragraph of texts.

To address this issue, the Text Rectifier uses a modified optimization framework that successfully rectifies multiple characters in the same plane, as illustrated by Equation (5):

$$\min_{A_i, E, \tau} \sum_{i=1}^{n} \|A_i\|_* + \|A\|_* + \lambda \|E\|_1, \quad \text{Equation (5)}$$
$$\text{s.t.} \quad D \circ \tau = A + E, A = [A_1, \ldots, A_n],$$

where $A_i$ stands for the i-th block of A. The above formulation is consistent with the observation that each character (hence each sub-image) is of low rank. Although $A_i$ should ideally correspond to a character, it is unnecessary to segment the image accurately in order for the Text Rectifier to provide good rectification results. In fact, only a rough estimate of the number of characters is needed, which can be easily derived from the aspect ratio of the specified region, and $A_i$ can be obtained by simply equally partitioning the region, or allowing the user to specify the number of regions to use.

For purposes of explanation, the multi-character formulation of call Equation (5) is referred to herein as "Multi-Component TILT." Accordingly, the TILT process for the single character case (or cases such as entire paragraphs treated as a single texture) illustrated by Equation (2) is referred to herein as "Uni-Component TILT." Although in many cases, an affine transform is sufficient for the uni-component case, the Text Rectifier typically needs to use projective transforms for the multi-component case as multiple characters often cover a larger region where perspective distortion in the image is not negligible.

Similar to Uni-Component TILT (see Equation (3)), Multi-Component TILT can be solved by linearizing with respect to the (projective) transform τ and then computing the increment of τ iteratively, leading to the following subproblem:

$$\min_{A_i, E, \Delta \tau} \sum_{i=1}^{n} \|A_i\|_* + \|A\|_* + \lambda \|E\|_1, \quad \text{Equation (6)}$$
$$\text{s.t.} \quad D \circ \tau + J \Delta \tau = A + E, A = [A_1, \ldots, A_n].$$

Then, the alternating direction method (ADM) discussed above can be deduced by minimizing its augmented Lagrangian function as illustrated by Equation (7):

$$L(A_i, E, \Delta \tau, Y, \mu) = \sum_{i=1}^{n} \|A_i\|_* + \|A\|_* + \lambda \|E\|_1 + \quad \text{Equation (7)}$$
$$\langle Y, D \circ \tau + J \Delta \tau - A - E \rangle + \sum_{i=1}^{n} \langle Y_i, A_i - P_i(A) \rangle +$$
$$\frac{\mu}{2} \left( \|D \circ \tau + J \Delta \tau - A - E\|_F^2 + \sum_{i=1}^{n} \|A_i - P_i(A)\|_F^2 \right)$$

where $P_i(A)$ extracts the i-th block of A (i.e., the sub-images or sub-regions of the selected image region, as noted above), Y and $Y_i$ are Lagrange multipliers, and μ is again the penalty parameter.

2.4 Enhancing the Performance of TILT for Character Rectification:

In general, the low-rank objective function shown above is a good indicator for the upright position of Chinese characters (or other character sets). However, a straightforward application of the generic TILT process (see Section 2.1), to deformed characters generally results in a moderate improvement in the recognition rate for typical OCT engines.

For example, for the 2,500 most common Chinese characters in "kaiti" rotated at 20 degrees, where the characters are black and the background is white, the recognition rate of Microsoft® OCR engine on the straightforward TILT rectified characters is approximately 69%. Although this rate is much higher than the approximately 2% recognition rate achieved without rectification, it is still not good enough for many practical uses. Further, when the input images are street signs taken from a relatively low resolution camera (such as the camera device in a mobile phone or other mobile device), the recognition rate may be even lower as the image quality is much worse. Consequently, the Text Rectifier uses one or more additional preprocessing steps (see the discussion regarding the binarization-inversion module 220 with respect to FIG. 2) in each iteration of the TILT process in order to make the TILT process more robust on text images, and to further improve the recognition rates for the resulting text using conventional OCR engines. Note also that the resulting undeformed text and characters can be processed using conventional antialiasing techniques to further improve the quality of the undeformed and rectified images for text recognition purposes.

2.4.1 Binarization:

In general, most OCR systems are trained on binary images of characters. Consequently, OCR engines tend to produce results having higher accuracy when presented with binary images. Thus, in various embodiments, for an input image, the Text Rectifier first conducts a foreground and background detection process, and then sets the intensity values of the foreground (i.e., text characters) as one (i.e., white) and sets the background to zero (i.e., black). However, rather than simply perform this binarization process only prior to processing, the binarization process the selected image region, D, is performed at every iteration when the image is updated with the incremental transform $\Delta\tau$ found from solving the linearized problem of Equation (3).

In various tested embodiments of the Text Rectifier it has been observed that the above-described iterative binarization process leads to much more stable performance of TILT on characters both from the library of standard fonts and from real images of street views captured using a variety of cameras having varying image quality. In fact, it has been observed that for the 2,500 most common Chinese characters in "kaiti" rotated at 20 degrees, where the characters are white on a black background, the recognition rate of the Microsoft® OCR engine on TILT rectified characters with binarization is approximately 94%, while that without binarization is approximately 85%.

2.4.2 Inversion:

Obviously, there are two options for binarization: one is to have white characters on a black background, and the other is to have black characters on a white background. Although the inversion will only affect the rank of the image by one, in practice it can significantly affect the performance of the TILT process. This is because unlike generic low-rank textures, pixels that define a character usually occupy a small portion of the image. So if the background is set as white, the objective function discussed above will be dominated by the background and will therefore be less sensitive to the character's proper pose. In fact, the entire character is likely to be interpreted as the sparse error by the TILT process.

Consequently, it has been observed that, in practice, the TILT process generally produces more accurate rectification results when using white characters on a black background, though either way can be used. In fact, when tested on the most common 2,500 Chinese characters in "kaiti" rotated at 20 degrees, the recognition rate of Microsoft® OCR engine on characters rectified in white on a black background is approximately 94%, while that for characters rectified in black on a white background was approximately 69%. Note that in both of these examples, the OCR engine was fed with rectified white characters on a black background (by inverting the black characters on white background case) following rectification of the image region containing the text. Consequently, the difference in OCR accuracy between these two cases is directly attributable to the accuracy of rectification, which in turn is directly attributable to whether white text on a black background, or the reverse, was provided to the TILT process for undeforming and rectifying that text.

3.0 Unwrapping Low-Rank Textures on Curved Surfaces:

In general, handling of curved surfaces presents additional challenges that are fully addressed by the Text Rectifier in various embodiments by further adapting the TILT process to reconstruct both 3D shape and 2D texture of a class of surfaces from a single perspective image. The resulting adaptations for handling curved surfaces are generally referred to herein as the "modified TILT process". This capability is achieved by considering so-called "generalized cylindrical surfaces" that are wrapped with low-rank textures. Such surfaces can be used to model most curved building facades in urban areas or deformed book pages, flags, banners, etc. that are scanned or photographed for text recognition. In other words, the recovered undistorted textures can be very useful for many tasks such as texture editing, synthesis, and text recognition. Note that the techniques described below detail the handling of smooth "cylindrical" surfaces (see discussion below regarding "Straight Homogeneous Generalized Cylinders"). However, it should be understood that the techniques described herein are extensible to other generalized classes of piecewise smooth surfaces.

The techniques described in the following paragraphs leverage the above described TILT processes for low-rank matrix recovery and sparse error correction while generalizing techniques from planar surfaces to a much larger class of real-world 3D surfaces. The resulting extensions to the Text Rectifier (and to the TILT processes in general) are capable of precisely rectifying deformation of textures caused by both perspective projection and surface shape. Further, the techniques provided by this modified TILT process work for a wide range of symmetric or regular textures that are ubiquitous in images of urban environments, objects, or texts, and are very robust to sparse occlusion, noise, and saturation.

In particular, the extensions to the Text Rectifier and to the TILT process for handling generalized cylindrical surfaces considers the problem of recovering, from a single image, the shape and pose of a family of surfaces referred to as "generalized cylindrical surfaces." For purposes of explanation, the techniques described below are adapted to a particular class of generalized cylinders, called "Straight Homogeneous Generalized Cylinders." However, as noted above, these techniques are extensible to other generalized classes of piecewise smooth surfaces.

"Straight Homogeneous Generalized Cylinders" represent a class of generalized cylinders that is considered to be quite useful in that it represents a family of shapes that can be used to describe the majority of curved building facades or deformed texts on curved surfaces (e.g., pages of open books, flags, banners, etc.). Such surfaces also have the property that any generalized cylindrical surface is isomorphic to a planar surface. Not every surface has this property. For instance, a sphere cannot be mapped to a plane without changing the metric on the surface. All geometric and statistical properties of textures on the surface are preserved under such an isomorphism.

While most existing techniques rely on statistical or geometrical relationships among local feature points or edges to rectify surfaces, the matrix rank minimization techniques provided by the modified TILT process enable the effective and efficient extraction of global linear correlation in images. As discussed in Section 2 with respect to the TILT process, it is possible to accurately recover the geometry of a planar surface given that the texture on the surface is low-rank. One advantageous feature of this method is its holistic nature: it does not rely on any local features, and is therefore very stable and robust to all kinds of nuisance factors (e.g., noise, partial occlusions, etc.) in real images. In addition, the low-rank objective function can harness many types of local or global regularities, including symmetry, parallelism, and orthogonality. Consequently, these techniques are applicable to a wide range of regular structures.

The following paragraphs show that the rank-minimization techniques of the TILT process can be effectively adapted or modified to rectify low-rank textures on arbitrary generalized cylindrical surfaces. This leads to a very efficient and effective algorithm that can accurately recover the 3D shape and 2D texture of the surface as well as the camera pose (i.e., viewing direction, field of view, focal point, etc.) from a single image. The resulting algorithm (generally referred to herein as the "modified TILT process") works robustly for a fairly large range of viewing angle, surface deformation, initialization, and image quality. It handles both curved building facades and scanned documents (e.g., curved pages of an open book, flags, banners, etc.) in the same way, and enables a wide range of applications such as 3D reconstruction, object or text recognition (e.g., rectification of text from images of curved building surfaces or book pages for presentation to an OCR engine), augmented reality images (e.g., insertion of text and/or objects into existing images using photo-realistic transforms ($\tau$) extracted from the existing images using the TILT process), etc.

Figure 4:
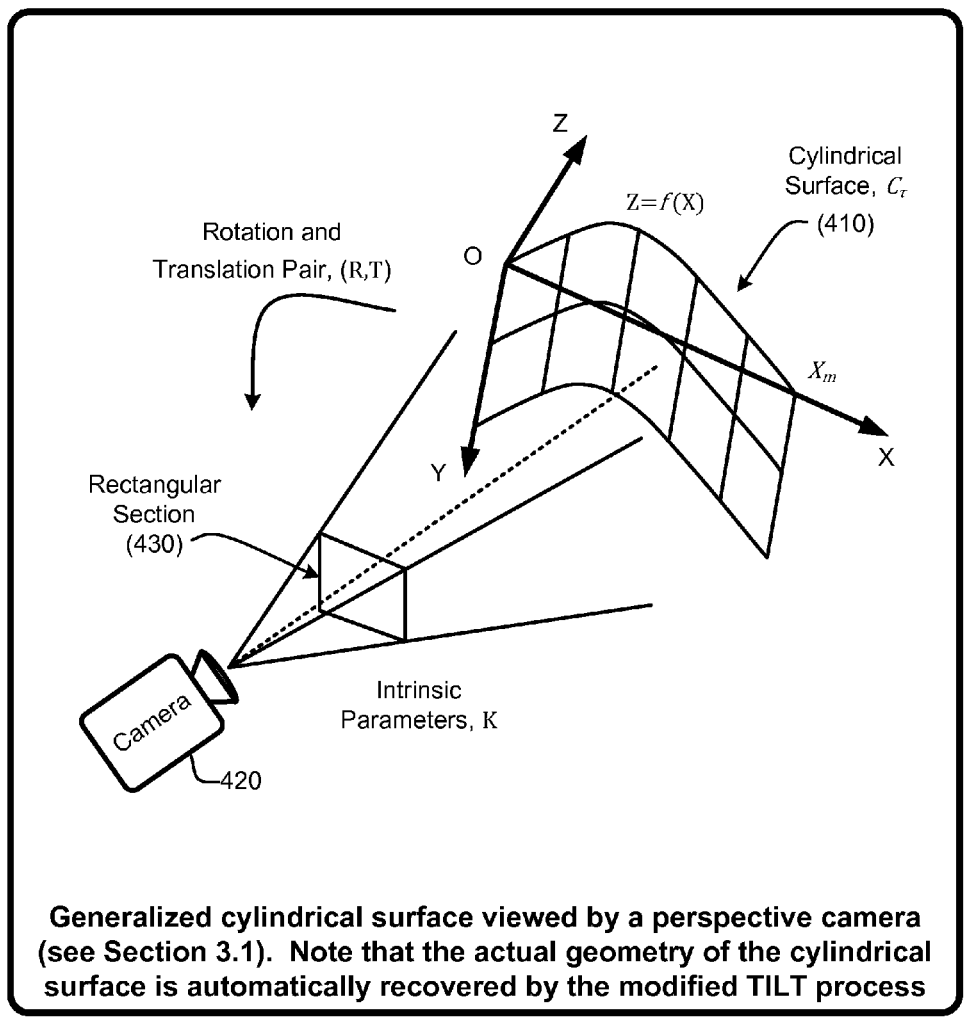
FIG. 4 provides an example of a generalized cylindrical surface viewed by a perspective camera, and wherein the actual geometry of the cylindrical surface is automatically recovered by the modified TILT process, as described herein.

3.1 Problem Formulation:

The following paragraphs describe a mathematical model and the corresponding objective function used to adapt the TILT process described in Section 2 to construct the modified TILT process for use in solving the problem of rectifying images of generalized cylindrical surfaces given a single image (or single selected image region). In general, the basic setup of this problem can be illustrated by FIG. 4. More specifically, FIG. 4 illustrates a cylindrical surface 410, denoted as C, and its geometric pose, described by a rotation and translation pair (R,T)$\in$SE(3), with respect to a perspective camera 420 (or other image/video capture device), with intrinsic parameters K$\in \mathbb{R}^{3\times 3}$. Note that the actual geometry of the cylindrical surface, C, is automatically recovered by the modified TILT process. As such, this geometric information is useful for a variety of purposes, including, but not limited to rectifying text on curved surfaces and reconstructing 3D models of urban scenes where curved facades are abundant given a sufficient variety of images of various portions of such scenes.

3.1.1 Model of the Curved Surface:

In general, it is assumed that the surface being evaluated belongs to the class of generalized cylindrical surfaces. Mathematically, a surface is called a generalized cylindrical surface if it can be described as:

$$c(s,t) = tp + h(s) \in \mathbb{R}^3 \qquad \text{Equation (8)}$$

where s, t$\in \mathbb{R}$, p$\in \mathbb{R}^3$, p$\perp$h'(s), and h(s)$\in \mathbb{R}^3$ is generally a smooth function. Thus, a generalized cylinder is a special class of ruled surfaces or flat surfaces.

Without loss of generality, a 3D coordinate frame (X,Y,Z) can be chosen such that the origin or center O is on the surface and Y-axis aligns with the direction of p (see FIG. 4 for an example of this concept). An approximately "rectangular" section 430 of the surface 410 whose X-coordinate is in the interval [0, $X_m$] is then considered as illustrated by FIG. 4.

As noted above, this "rectangular" region can be an irregular trapezoidal region (or other shape) that differs substantially from an ideal rectangle without adversely affecting the performance of the modified TILT process described herein. However, for purposes of discussion, this document will generally refer to the region selected for processing to be generally rectangular in nature. Note however that the selection of regions using highly irregular shapes may degrade the performance of the modified TILT process in some cases, depending upon the underlying geometry of the texture being processed.

Again, without loss of generality, it is assumed that the starting point of the section is the origin O and the end point is ($X_m$,0,0). Note that generality is not lost by making this assumption as it helps fix the X-axis of the coordinate frame. In this coordinate frame, the expression of the function h($\bullet$) can be simplified and uniquely determined by a scalar function Z=f(X). Note that the following discussion assumes that the function Z=f(X) can be modeled by a polynomial up to degree d+2 (typically a value of d$\leq$4 is used unless otherwise stated, though larger values can be used). Therefore, an explicit expression of the surface can be written as:

$$Z \doteq f_\tau(X) = X(X - X_m)\left(\sum_{i=0}^{d} a_i X^i\right) \qquad \text{Equation (9)}$$

where $\tau=\{a_0, \ldots, a_d\}$ is used to denote the collection of transform parameters for the curved surface. Note that when all $a_i$'s are zero, the surface reduces to a planar surface Z=0 (i.e., the planar problem solved with respect to the general TILT process discussed in Section 2). Further, the surface $C_\tau$ is denoted using the subscript $\tau$ to indicate its dependency on the transform parameters $\tau$.

3.1.2 Model of the Low-Rank Texture on the Surface:

In modeling the low-rank texture of the curved surface, it is assumed that a 2D function $I_0(x,y)$ is defined on the surface $C_\tau$ between the section X=0 and X=$X_m$ which models a texture wrapped on the surface. Note that in various tested embodiments, $X_m$ is a fixed number corresponding to the number of pixels of the unwrapped texture image (in the x-direction). In other words, to generate a texture image, a uniform number, $X_m$, of samples are taken along the surface in the X-direction (however, it should be understood that $X_m$ can be increased or decreased, as desired, to address particular applications.

Without loss of generality, it is assumed that the y coordinate of the texture function is aligned with the Y-axis, and x is proportional to the geodesic distance on the surface along the X-direction. Note that when the parameters of the curve change, the geodesic distance also changes. Nevertheless, such a parameterization ensures that the unwrapping is isomorphic (up to a constant scale). Therefore, if $I_0(x,y)$ is a low-rank function, then when the surface $C_\tau$ is unwrapped to a planar surface by an isomorphism, then $I_0$ represents a low-rank texture defined on that plane.

For any point (x,y) in the texture coordinates, its 3D coordinate ($X_\tau, Y_\tau, Z_\tau$) is found on the cylindrical surface $C_\tau$. Note that the subscript $\tau$ is again used to indicate the map's dependency on the transform parameters $\tau$. In solving this problem, let $L_\tau \doteq \int_0^{X_m} \sqrt{1 + f'_\tau(X)^2} \, dX$ be the geodesic distance from the origin O to ($X_m$,0,0) on the surface. Then the following set of equations determine the isomorphic (wrapping) map between (x,y) to ($X_\tau, Y_\tau, Z_\tau$) that meets above specifications, as illustrated by Equation 10, where:

$$\begin{cases} x = \dfrac{X_m}{L_\tau} \int_0^{X_\tau} \sqrt{1 + f'_\tau(X)^2} \, dX \\ y = Y_\tau \\ Z_\tau = f_\tau(X_\tau) \end{cases} \qquad \text{Equation (10)}$$

3.1.3 Modeling the Camera:

Suppose the camera used has intrinsic parameters $$K = \begin{bmatrix} f_x & \alpha & o_x \\ 0 & f_y & o_y \\ 0 & 0 & 1 \end{bmatrix} \in \mathbb{R}^{3 \times 3}$$

and its position with respect to the surface coordinate frame (X,Y,Z) is specified by the Euclidean transform (R,T) where $R \in \mathbb{R}^{3 \times 3}$ and $T \in \mathbb{R}^3$. Assume that this camera is then used to capture an image I(u,v) of the surface $C_\tau$ that is then processed using the modified TILT process described herein.

In particular, given the image I (or a selected region thereof), a point (on the surface) with 3D coordinates $(X_\tau, Y_\tau, Z_\tau)$ is mapped to the image pixel coordinates (u,v) as follows:

$$\begin{bmatrix} x_n \\ y_n \end{bmatrix} = \begin{bmatrix} \frac{R_{1,1}X_\tau + R_{1,2}Y_\tau + R_{1,3}Z_\tau + T_1}{R_{3,1}X_\tau + R_{3,2}Y_\tau + R_{3,3}Z_\tau + T_3} \\ \frac{R_{2,1}X_\tau + R_{2,2}Y_\tau + R_{2,3}Z_\tau + T_2}{R_{3,1}X_\tau + R_{3,2}Y_\tau + R_{3,3}Z_\tau + T_3} \end{bmatrix} \quad \text{Equation (11)}$$

$$\begin{bmatrix} u \\ v \\ 1 \end{bmatrix} = K \begin{bmatrix} x_n \\ y_n \\ 1 \end{bmatrix} = \begin{bmatrix} f_x x_n + \alpha y_n + o_x \\ f_y y_n + o_y \\ 1 \end{bmatrix} \quad \text{Equation (12)}$$

Figure 5:
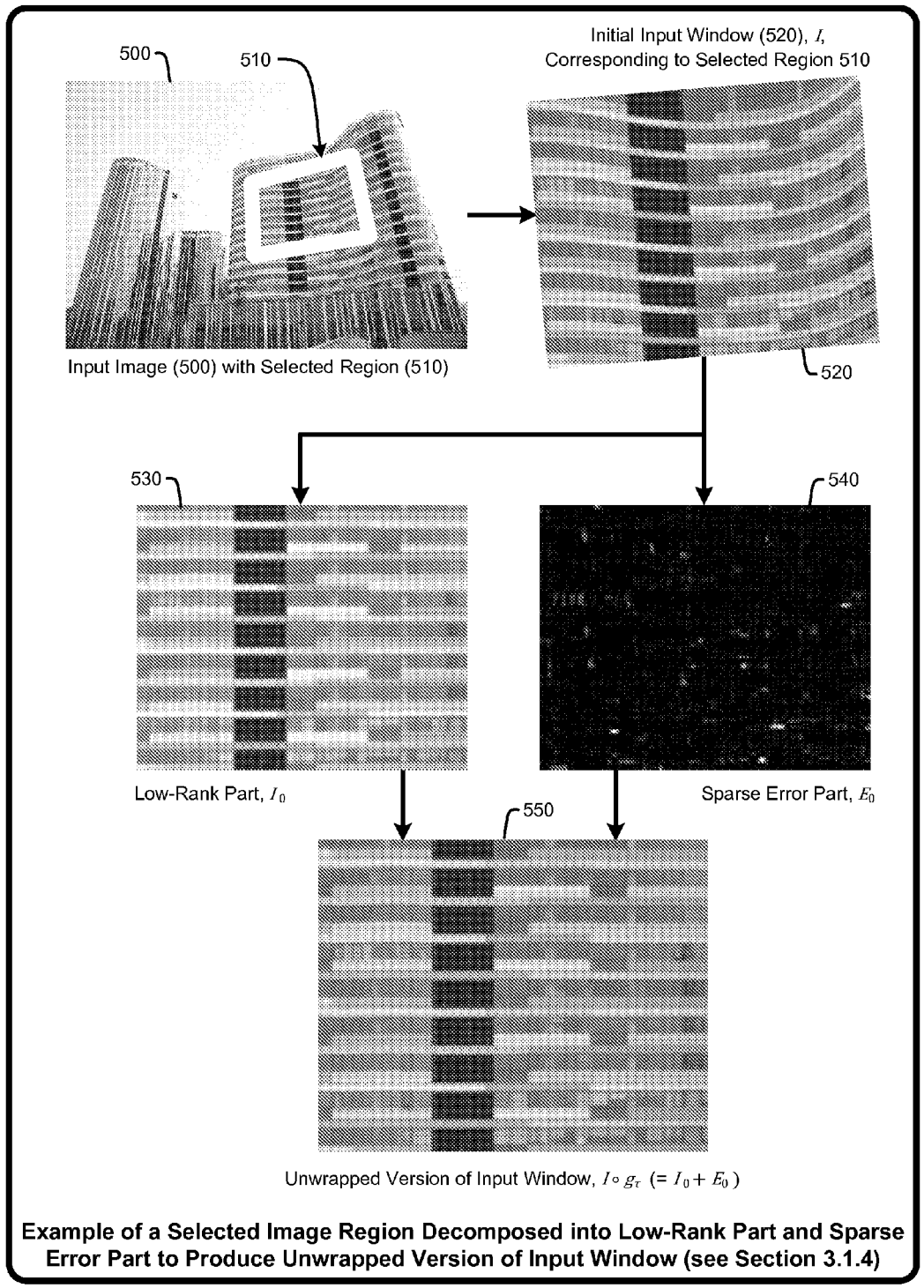
FIG. 5 provides an example of a selected region of an input image of a curved building facade that is decomposed into a low-rank part and a sparse error part that, together, give an unwrapped version of the selected region of the input image, as described herein.

3.1.4 Recovery via Robust Rank Minimization:

The image I(u,v) is considered to represent a transformed version of the low-rank texture $I_0(x,y)$ on the cylindrical surface $C_\tau$. Therefore, the compounded map from the texture coordinate (x,y) to the image coordinate (u,v) is denoted as illustrated by Equation (13):

$$g_\tau(x,y):(x,y) \mapsto (u,v) \quad \text{Equation (13)}$$

which again depends on the parameters τ. Then ideally, this means that $I \circ g_\tau = I_0$. However, in practice, the image is likely to be a corrupted version of the low-rank texture, due to a variety of reasons such as noise, occlusions, etc. As such, Equation (13) may not hold for a small fraction of the pixels in the image. Consequently, a more robust model for the imaging process also considers the sparse error E, as illustrated by Equation (14):

$$I \circ g_\tau = I_0 \pm E_0 \quad \text{Equation (14)}$$

for some sparse matrix $E_0$. FIG. 5 illustrates this model with a real example of an input image 500 of a curved building facade. In particular, as illustrated by FIG. 5, a selected region 510 of the input image 500 is used to extract an initial input window 520 for processing. Using the modified TILT process, the initial input window 520 is decomposed into a low-rank part 530 and a sparse error part 540. Together, the low-rank part 530 and a sparse error part 540 give the unwrapped version 550 (i.e., the undeformed and rectified version) of the input window.

Therefore, given an image I, the modified TILT process recovers all of the unknown parameters τ (such as the polynomial coefficients), and rectifies the image using $g_\tau$ so as to recover the low-rank texture $I_0$, despite some sparse errors $E_0$. Note also that if the camera calibration K and pose (R,T) are unknown or only partially known, they are also part of the parameters τ that are recovered by the modified TILT process. Further, once recovered, the camera calibration K and pose (R,T) can be used to transform and insert objects or text back into the original image in a photo-realistic manner (see Section 3.4.2 and FIG. 9 for a discussion of this concept). Note also that recovery of this information provides the geometry of the surface being evaluated by the modified TILT process.

Then, similar to Equation (3), in order to recover the low-rank component $I_0$ and the sparse component $E_0$, the following optimization problem is solved:

$$\min_{\tau, L, S} \|L\|_* + \lambda \|S\|_1 \quad \text{s.t.} \quad I \cdot g_\tau = L + S, \quad \text{Equation (15)}$$

where $L \in \mathbb{R}^{m \times n}$ is the estimate for the low-rank component and S for the sparse component. Here λ is chosen such that $\lambda = 1/\sqrt{\max(m,n)}$, as discussed with respect to the TILT process.

Figure 6:
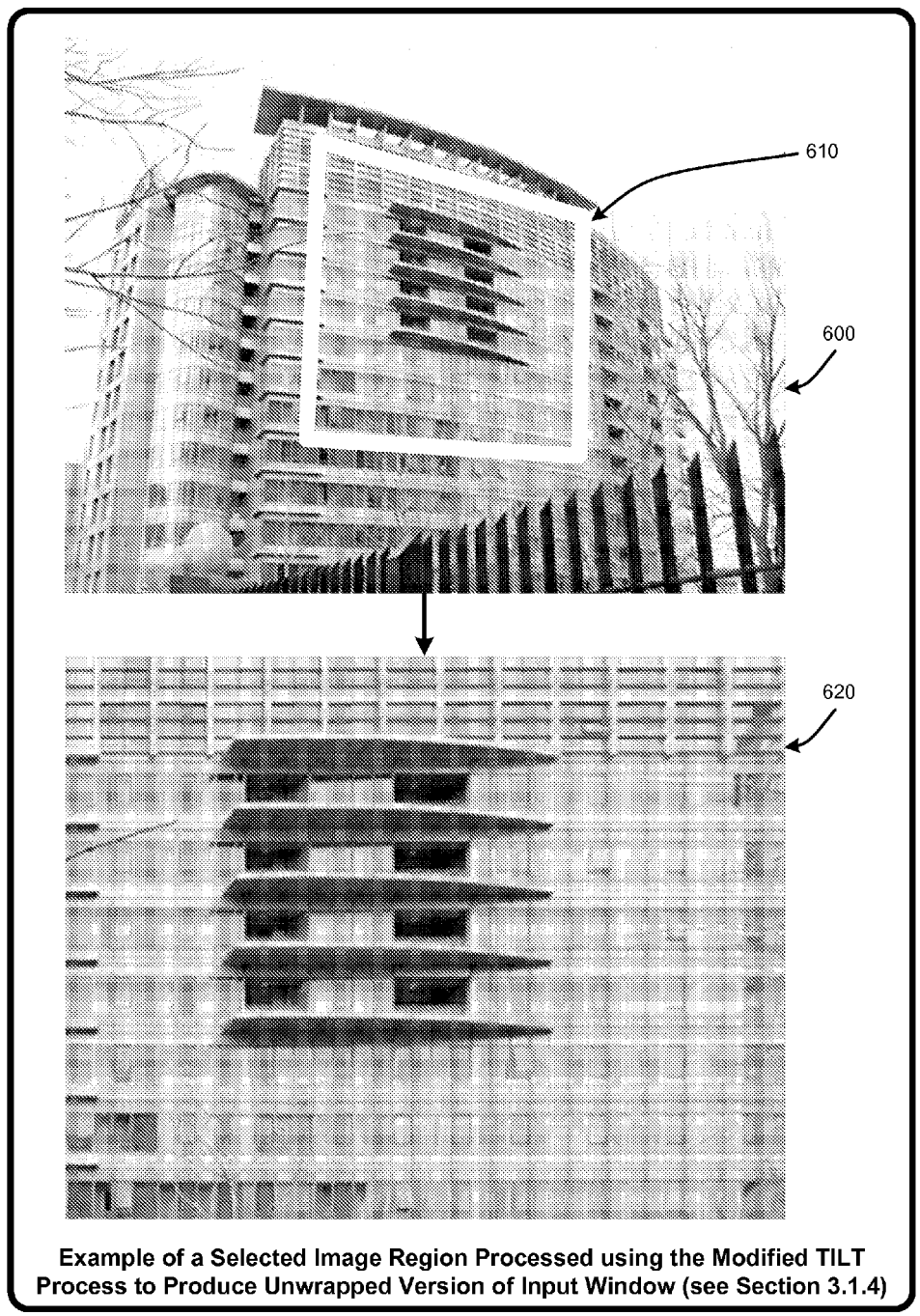
FIG. 6 provides an example of a selected region of an input image of a curved building facade that is processed to produce an unwrapped version of the selected region of the input image, as described herein.

FIG. 6 provides a simple example of an input image 600 of a curved building facade. A selected region 610 of the input image 600 is then processed by the modified TILT process to produce a low rank output texture that represents an undeformed (or unwrapped) and rectified image 620 of the selected region.

3.2 Solution and Algorithm Details:

Although the objective function of the optimization problem of Equation (15) is convex, its constraint $I \circ g_\tau = L + S$ is highly nonlinear. Therefore, one strategy to solve such problems is to linearize the constraint around the current estimate of the parameters τ and iteratively update the estimate by solving the linearized version repeatedly, as illustrated by Equation (16):

$$\min_{\Delta \tau, L, S} \|L\|_* + \lambda \|S\|_1 \quad \text{s.t.} \quad I \cdot g_\tau + J \Delta \tau = L + S, \quad \text{Equation (16)}$$

where J is the Jacobian of the image against the unknown parameters τ. Consequently, as long as the Jacobian can be evaluated at each iteration, the linearized problem is a convex program. A similar ADM algorithm to the one described with respect to the TILT process can be used for solving this convex program and then updating the estimate of $\tau \leftarrow \tau + \Delta \tau$ for the original problem illustrated by Equation (15). Note that in practice, it normally takes about 20-30 iterations for the algorithm to converge. However, more complex shape examples may take more iterations to reach convergence.

3.2.1 Jacobian against Shape Parameters:

In view of the proceeding discussion, it can be seen that the problem can be expressed as how to evaluate the Jacobian of the image I against all the unknown parameters τ. Notice that the dependency of I on τ is all through the nonlinear map $g_\tau$, hence the Jacobian is:

$$J = \frac{\partial I \cdot g_\tau(x,y)}{\partial \tau} = \nabla I \cdot \frac{\partial g_\tau(x,y)}{\partial \tau} \quad \text{Equation (17)}$$

where $\nabla I$ is simply the gradient of the image I with respect to the image coordinates $g_\tau(x,y)=(u,v)$. Thus, it remains to compute Equations (18), (19) and (20) in order to solve Equation (17):

$$\frac{\partial g_\tau(x, y)}{\partial \tau} = \frac{\partial}{\partial \tau} \begin{bmatrix} f_x x_n + \alpha y_n + o_x \\ f_y y_n + o_y \end{bmatrix} \quad \text{Equation (18)}$$

$$= \begin{bmatrix} f_x & \alpha \\ 0 & f_y \end{bmatrix} \begin{bmatrix} \frac{\partial x_n}{\partial \tau} \\ \frac{\partial y_n}{\partial \tau} \end{bmatrix}$$

$$\frac{\partial x_n}{\partial \tau} = \frac{R_{1,1} \frac{\partial X_\tau}{\partial \tau} + R_{1,3} \frac{\partial Z_\tau}{\partial \tau}}{(R_{3,1} X_\tau + R_{3,2} Y_\tau + R_{3,3} Z_\tau + T_3)} - \quad \text{Equation (19)}$$

$$\frac{R_{3,1}(R_{1,1} X_\tau + R_{1,2} Y_\tau + R_{1,3} Z_\tau + T_1) \frac{\partial X_\tau}{\partial \tau}}{(R_{3,1} X_\tau + R_{3,2} Y_\tau + R_{3,3} Z_\tau + T_3)^2} -$$

$$\frac{R_{3,3}(R_{1,1} X_\tau + R_{1,2} Y_\tau + R_{1,3} Z_\tau + T_1) \frac{\partial Z_\tau}{\partial \tau}}{(R_{3,1} X_\tau + R_{3,2} Y_\tau + R_{3,3} Z_\tau + T_3)^2}$$

$$\frac{\partial y_n}{\partial \tau} = \frac{R_{2,1} \frac{\partial X_\tau}{\partial \tau} + R_{2,3} \frac{\partial Z_\tau}{\partial \tau}}{(R_{3,1} X_\tau + R_{3,2} Y_\tau + R_{3,3} Z_\tau + T_3)} - \quad \text{Equation (20)}$$

$$\frac{R_{3,1}(R_{2,1} X_\tau + R_{2,2} Y_\tau + R_{2,3} Z_\tau + T_2) \frac{\partial X_\tau}{\partial \tau}}{(R_{3,1} X_\tau + R_{3,2} Y_\tau + R_{3,3} Z_\tau + T_3)^2} -$$

$$\frac{R_{3,3}(R_{2,1} X_\tau + R_{2,2} Y_\tau + R_{2,3} Z_\tau + T_2) \frac{\partial Z_\tau}{\partial \tau}}{(R_{3,1} X_\tau + R_{3,2} Y_\tau + R_{3,3} Z_\tau + T_3)^2}$$

where it should be noted that, by choice, $Y_\tau$ does not depend on $\tau$.

Since $$\frac{\partial Z_\tau}{\partial \tau} = \frac{\partial f_\tau(X_\tau)}{\partial \tau} = \frac{\partial f_\tau}{\partial \tau}\bigg|_{X=X_\tau} + f_{\tau'}(X_\tau) \frac{\partial X_\tau}{\partial \tau},$$

it is only necessary to compute $$\frac{\partial f_\tau}{\partial \tau}$$

and $$\frac{\partial X_\tau}{\partial \tau}.$$

However, from the definition of $X_\tau$ in Equation (10):

$$\int_0^{X_\tau} \sqrt{1 + f_{\tau'}(X)^2}\, dX = \frac{x}{X_m} L_\tau \quad \text{Equation (21)}$$

Therefore, differentiating both sides of (21) with respect to $\tau$, gives:

$$\sqrt{1 + f_{\tau'}(X_\tau)^2} \frac{\partial X_\tau}{\partial \tau} + \int_0^{X_\tau} \frac{f_{\tau'}(X)}{\sqrt{1 + f_{\tau'}(X)^2}} \frac{\partial f_{\tau'}(X)}{\partial \tau} dX = \quad \text{Equation (22)}$$

$$\frac{x}{X_m} \int_0^{X_m} \frac{f_{\tau'}(X)}{\sqrt{1 + f_{\tau'}(X)^2}} \frac{\partial f_{\tau'}(X)}{\partial \tau} dX$$

which in turn gives:

$$\frac{\partial X_\tau}{\partial \tau} = \frac{\dfrac{x}{X_m} \int_0^{X_m} \dfrac{f_{\tau'}(X)}{\sqrt{1 + f_{\tau'}(X)^2}} \dfrac{\partial f_{\tau'}(X)}{\partial \tau} dX - \int_0^{X_\tau} \dfrac{f_{\tau'}(X)}{\sqrt{1 + f_{\tau'}(X)^2}} \dfrac{\partial f_{\tau'}(X)}{\partial \tau} dX}{\sqrt{1 + f_{\tau'}(X_\tau)^2}} \quad \text{Eqn. (23)}$$

where $$\frac{\partial}{\partial \tau}$$

against all the parameters $\{a_i\}$ in $\tau$ is:

$$\frac{\partial f_\tau(X)}{\partial a_i} = X(X - X_m) X^i \quad \text{Equation (24)}$$

$$\frac{\partial f_{\tau'}(X)}{\partial a_i} = (2X - X_m) X^i + X(X - X_m) i X^{i-1}$$

Given the above described derivation, all ingredients for evaluating the Jacobian of Equation (17) are now available. In particular, based on the above derivations, in order to evaluate the Jacobian, two integrals in Equation (23) are evaluated, which do not have closed-form expressions. Advantageously, the Jacobian only needs to be computed once for each iteration using the current estimate for $\tau$. Consequently, these two integrals can simply be evaluated numerically, if desired, for purposes of computational efficiency. Therefore, compared to the rest of the algorithms where the singular value decomposition (SVD) of the low-rank matrix L is computed repeatedly, the cost for evaluating the two integrals is almost negligible and it does not noticeably affect the overall efficiency of the modified TILT process.

3.2.2 Updating Camera Parameters:

In the above derivation, it was assumed that the camera parameters K and (R,T) are fixed. Therefore, this means that K and (R,T) would be known in advance. However, in many real-world applications, this is not the case.

As noted above, the Text Rectifier receives an input that defines a selected region of the input image. This input is received as a 4-sided polygon on the surface of the image, which ideally would correspond to a "rectangular" region on the cylindrical surface as discussed above in Section 3.1 and with respect to FIG. 4. Ideally, this polygon would correspond to a rectangle in 3D, and the orthogonality of its two sides could be used to impose one linear constraint on the camera intrinsic parameters. Also, the camera pose (R,T) could then be calculated from the homography between the rectangle and the image plane.

However, in practice, the four corners of the selected region given by the user can significantly deviate from such an ideal rectangular region. In such cases, using the "ideal" formulation of the problem, the Text Rectifier (and the modified TILT process) might not return a valid estimation of K, let alone (R,T). Fortunately, since almost all digital cameras save JPEG files with EXIF (Exchangeable Image File) data, camera settings and scene information are recorded by the camera into the image file. Therefore, focal length can simply be fetched from EXIF information contained in the image file if it's taken by a modern digital camera. Further by making fairly realistic assumptions such as the pixel being square and the principle point being at the center of the image, an approximate estimate of K can be obtained that is sufficient for achieving acceptable rectification results using the modified TILT process. In addition, once this estimate of K is known, the values for (R,T) can be derived from the homography between the rectangular region and the image.

However, it should be noted that the initial estimate of (R,T) can be incorrect as the initial window (i.e., the user selected input region) can be far off from a true rectangle in 3D. Therefore, the modified TILT process used by the Text Rectifier adjusts the initial estimate of (R,T) so that the initial input window corresponds to a rectangular region on the cylindrical surface. Consequently the modified TILT process treats (R,T) as part of the unknown parameters τ and updates their estimates at each iteration. Note that R is parameterized using the well-known "Rodrigues' formula."

Further, to prevent the algorithm from converging to a point or expanding indefinitely, it is assumed that the distance between the camera and the surface is a fixed constant, i.e., it is assumed that the z-coordinate of T is fixed. This assumption is reasonable because it removes the ambiguity in the scale from a single image. The Jacobian of the image I against these parameters is derived as discussed with respect to the TILT process.

It has been observed that in tested embodiments of the modified TILT process described herein, the algorithm has a significantly large region of convergence for the camera parameters. Further, it has also been observed that the initial input window does not have be very precise in order for the algorithm to converge to an accurate solution.

3.3 Rectification of Deformed Texts on Curved Surfaces:

The modified TILT process described above not only works very well on all kinds of curved building facades, but also works on deformed text on various types of curved surfaces, such as, for example, curved book pages, labels on bottles, banners on curved building fronts, etc., whether such surfaces are concave or convex. Consequently, in view of the preceding discussion, it should be clear that the various embodiments of the Text Rectifier described throughout Section 2 of this document are enhanced by the added capability of the modified TILT process to handle curved surfaces. In addition, the binarization and/or inversion techniques described in Section 2 may also be used to further enhance the images of text in the undeformed and rectified images recovered from images of curved surfaces by the modified TILT process.

Figure 7:
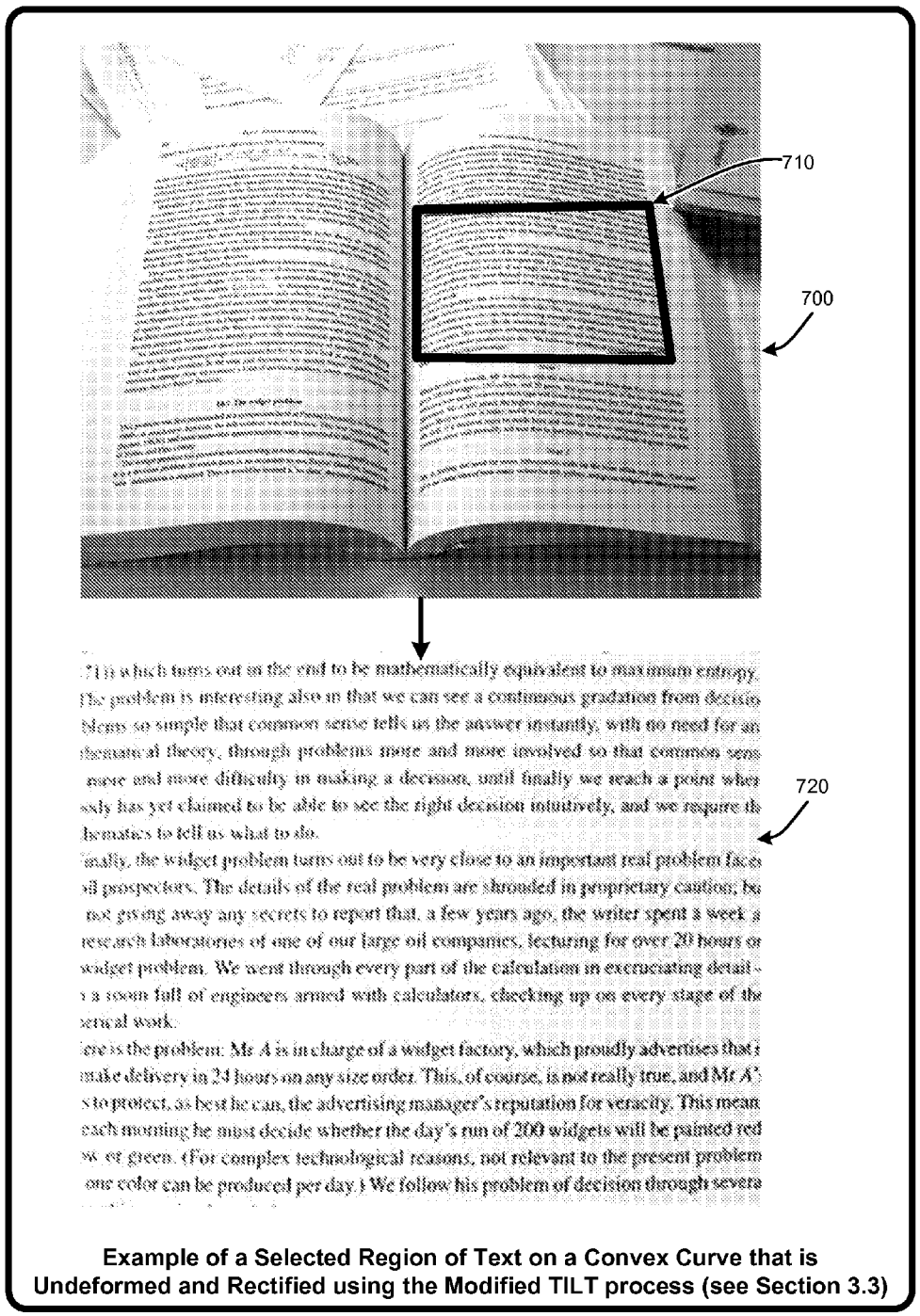
FIG. 7 shows an image of text on the curved page (convex curve) of an open book that is untransformed (unwrapped) and rectified by the Text Rectifier, as described herein.

An example of a convex surface having text is illustrated by FIG. 7. Typically, if such an image were provided to a conventional OCR engine without any additional processing, the OCR results returned by the OCR engine would be quite poor. However, by first processing a selected region of a curved page of text, the modified TILT process returns an image of text that has been undeformed and rectified in a manner that significantly improves the performance of typical OCR engines.

In particular, FIG. 7 shows an image of text on a page of an open book 700. Clearly, this page is represented by a convex curve that is further distorted by both a perspective transform and a small rotation relative to the point of view of the camera that captured the image. A user selected region 710 of the page is shown using a dark trapezoid. Following processing of the user selected region 710, the modified TILT process returns an image 720 of undeformed (unwrapped) and rectified text. Note that the resulting text image 720 could have been further enhanced using the binarization and inversion techniques described in Section 2 in combination with the modified TILT process. Clearly, the undeformation or unwrapping and rectification of text in such images will significantly improve the recognition performance of typical OCR engines for such deformed texts.

Figure 8:
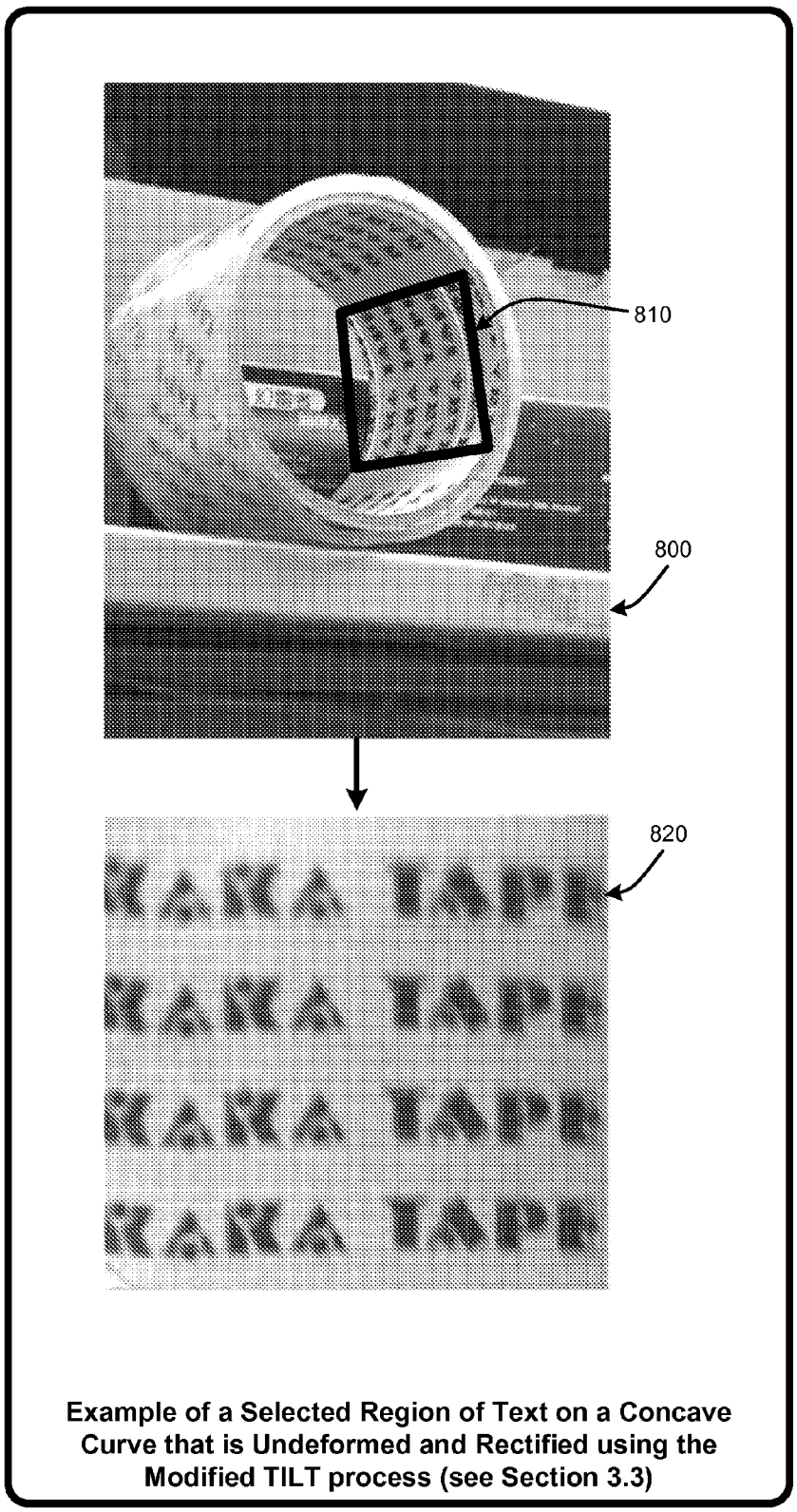
FIG. 8 shows an image of text on the interior curve (concave) of a roll of tape that is untransformed (unwrapped) and rectified by the Text Rectifier, as described herein.

An example of the undeformation and rectification of text regions on a concave surface is illustrated by FIG. 8. In particular, FIG. 8 shows an image 800 of text on the inner surface of a roll of tape. A user selected region 810 of the text on the inner surface of the roll of tape is shown using a dark trapezoid. Following processing of the user selected region 810, the modified TILT process returns an image 820 of undistorted (or unwrapped) and rectified text that can be further enhanced using the binarization and inversion techniques described in Section 2. Clearly, the undeformation and rectification of text in such images will significantly improve the recognition performance of typical OCR engines for such deformed texts.

3.4 Additional Applications and Extensions:

As discussed above, the modified TILT process provides various techniques for rectifying low-rank textures on a generalized cylindrical surface from a single perspective image by accurately recovering the shape of the surface and the pose of the camera used to capture the image. Some of the uses discussed above include the undeformation of text on curved building surfaces and book pages. However, it should be clear that the uses of the modified TILT process are not limited to such applications. For example, in addition to text undeformation and rectification, these techniques are useful for 3D reconstruction of buildings. Other uses of the recovered undistorted textures from selected image regions include, but are not limited to texture editing, synthesis, shape recovery, augmented reality images, etc. Specific examples of some of the uses are discussed in the following paragraphs.

3.4.1 Recovering Shape from Low-Rank Textures:

With all geometric information recovered from the modified TILT process, it is a simple matter to retrieve the camera position (R,T) and the curved surface shape c(s,t) (from $f_\tau(X)$) in 3D that is consistent with the given image. Consequently, the modified TILT process is useful for recovering the actual geometric shape of curved surfaces from a single image of those surfaces. Exemplary uses of such information include, but are not limited to reconstructing 3D models of urban scenes where curved facades are abundant. In fact, these methods accurately recover both the 3D shape of the surface and camera pose (e.g., position and viewing direction of the camera relative to the surface, or conversely, rotation and translation of the surface relative to the camera).

3.4.2 Augmented Reality Images:

As discussed above, the modified TILT process can precisely estimate and then undo the distortion of the low-rank texture $I_0(x,y)$ caused by the perspective projection and the curved surface captured in an image. This information can be used to perform many interesting editing or processing tasks on the given image and surface. For instance, virtual objects, such as, for example, a movie poster, can be super-imposed onto the original image or can be used to replace the texture of the surface (or some portion thereof) while respecting all the camera and scene geometry.

In other words, images of objects or textures can be transformed using the inverse of the transforms or distortions used to rectify the texture of the selected region of the original image. The reverse transformed image or texture can then be inserted into the original image as a replacement texture or image patch. Since the transforms applied to the replacement texture or image patch match the underlying geometry of the image, the insertion will be photorealistic. Note that additional processing techniques, such as, for example, blending and/or feathering of the edges of inserted image textures or image patches can be perform to further enhance image quality.

Figure 9:
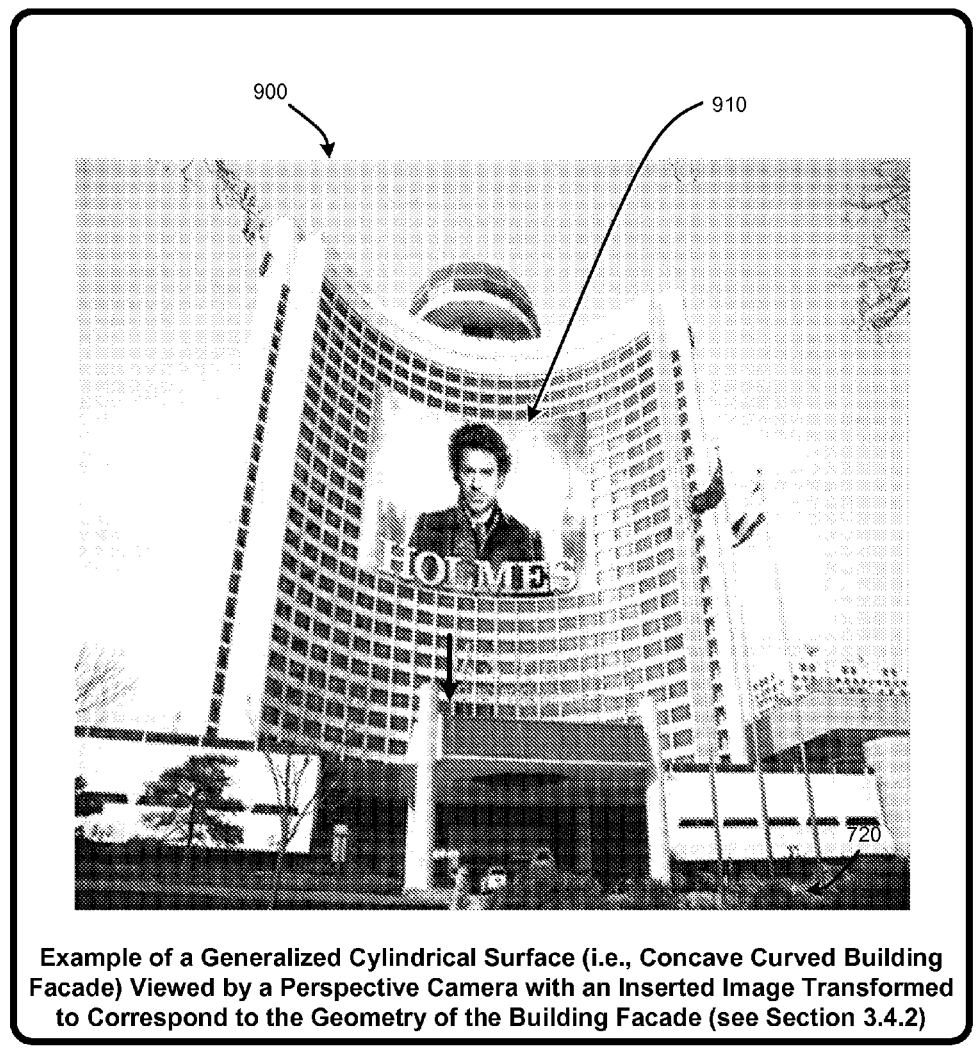
FIG. 9 provides an example of a concave building facade with an inserted image of a movie poster that has been transformed to correspond to the geometry of the building facade, as described herein.

FIG. 9 provides a simple graphic example of this concept. In particular, the modified TILT process described above was used to extract the geometry of a curved building facade as well as the corresponding transforms relative to the camera used to capture an image 900 of the building. This geometric information was then used in combination with the corresponding transforms to apply the reverse geometry and transforms to a movie poster 910 to match the curvature and the perspective transforms of the building facade relative to the camera used to capture the image 900. By then pasting or inserting the transformed movie poster 910 into the original image 900, the original image is modified in a photorealistic manner to include the movie poster across a portion of the building facade.

Note that similar processes can be used for a variety of purposes, including, but clearly not limited to, inserting images of text (or other textures) into an original image of the curved pages of an open book or onto an image of the surface of a curved bottle or flag to replace or insert text in the original image. Such replacements can be done in a manner such that the replacement or insertion of text is photorealistic and is thus not readily apparent to an observer of the modified image.

Figure 10:
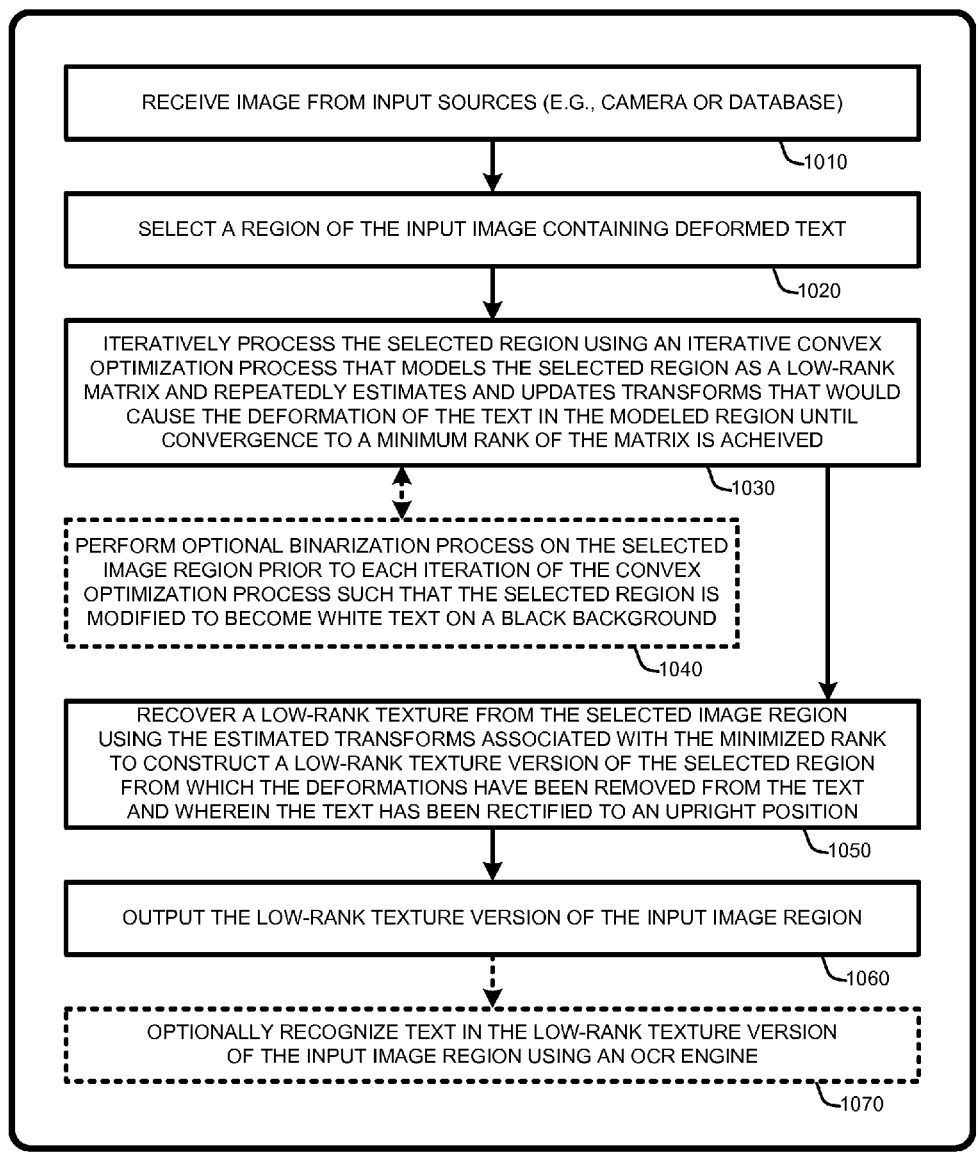
FIG. 10 illustrates a general system flow diagram that illustrates exemplary methods for implementing various embodiments of the Text Rectifier, as described herein.

4.0 Operational Summary of the Text Rectifier:

Various processes described above with respect to FIG. 1 through FIG. 9 and in further view of the detailed description provided above in Sections 1 through 3 are illustrated by the general operational flow diagram of FIG. 10. In particular, FIG. 10 provides an exemplary operational flow diagram that summarizes the operation of some of the numerous embodiments of the Text Rectifier. Note that FIG. 10 is not intended to be an exhaustive representation of all of the various embodiments of the Text Rectifier described herein, and that any embodiments represented in FIG. 10 are provided only for purposes of explanation.

Further, it should be noted that any boxes and interconnections between boxes that are represented by broken or dashed lines in FIG. 10 represent optional or alternate embodiments of the Text Rectifier described herein, and that any or all of these optional or alternate embodiments, as described below, may be used in combination with other alternate embodiments that are described throughout this document.

In general, as illustrated by FIG. 10, the Text Rectifier begins operation by receiving 1010 or selecting an image from some input source (e.g., a camera or database of images). Once an image has been received 1010 or selected, some region of that input image containing deformed or transformed text is then selected 1020 or otherwise designated by the user.

Next, the Text Rectifier iteratively processes the selected region using an iterative convex optimization process 1030 that models the selected region as a low-rank matrix and repeatedly estimates and updates transforms that would cause the deformation of the text in the modeled region until convergence to a minimum rank of the matrix is achieved.

One enhancement to the Text Rectifier that improves rectification results of text is to perform an optional binarization process 1040 on the selected image region prior to each iteration of the convex optimization process. In general, this optional binarization process 1040 converts the selected region to a binary image (i.e., black and white) that is then inverted, if necessary, to that the selected image region is modified to become white text on a black background.

In either case, following the iterative convex optimization process 1030, the Text Rectifier recovers 1050 a low-rank texture from the selected image region using the estimated transforms associated with the minimized rank to construct a low-rank texture version of the selected region. In general, as discussed in detail above, this recovered low-rank texture version of the selected input image region represents an image from which the deformations have been removed from the text and wherein the text has been rectified to an upright position.

The Text Rectifier then outputs 1060 the low-rank texture version of the input image region for whatever further use or processing. For example, one such use is to optionally recognize 1070 text in the low-rank texture version of the input image region using an OCR engine.

Figure 11:
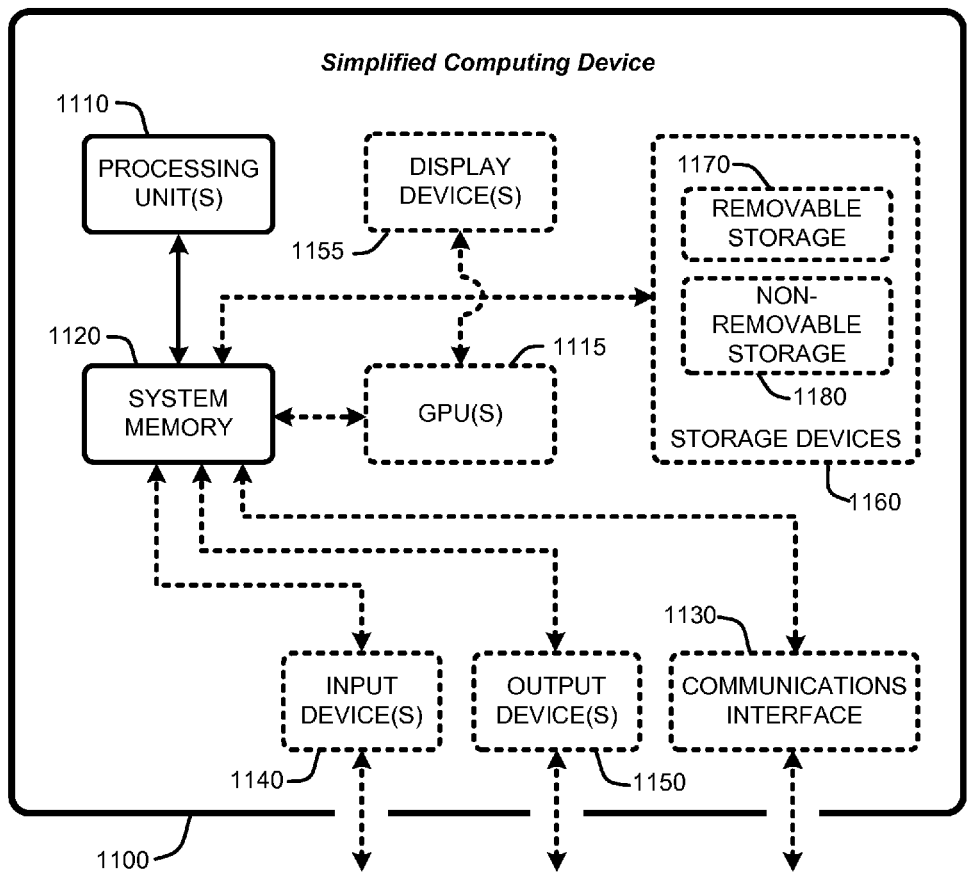
FIG. 11 is a general system diagram depicting a simplified general-purpose computing device having simplified computing and I/O capabilities for use in implementing various embodiments of the Text Rectifier, as described herein.

5.0 Exemplary Operating Environments:

The Text Rectifier described herein is operational within numerous types of general purpose or special purpose computing system environments or configurations. FIG. 11 illustrates a simplified example of a general-purpose computer system on which various embodiments and elements of the Text Rectifier, as described herein, may be implemented. It should be noted that any boxes that are represented by broken or dashed lines in FIG. 11 represent alternate embodiments of the simplified computing device, and that any or all of these alternate embodiments, as described below, may be used in combination with other alternate embodiments that are described throughout this document.

For example, FIG. 11 shows a general system diagram showing a simplified computing device such as computer 1100. Such computing devices can typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the Text Rectifier, the device should have a sufficient computational capability and system memory to enable basic computational operations. In particular, as illustrated by FIG. 11, the computational capability is generally illustrated by one or more processing unit(s) 1110, and may also include one or more GPUs 1115, either or both in communication with system memory 1120. Note that that the processing unit(s) 1110 of the general computing device may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 11 may also include other components, such as, for example, a communications interface 1130. The simplified computing device of FIG. 11 may also include one or more conventional computer input devices 1140 (e.g., pointing devices, keyboards, audio input devices, video input devices, haptic input devices, devices for receiving wired or wireless data transmissions, etc.). The simplified computing device of FIG. 11 may also include other optional components, such as, for example, one or more conventional computer output devices 1150 (e.g., display device(s) 1155, audio output devices, video output devices, devices for transmitting wired or wireless data transmissions, etc.). Note that typical communications interfaces 1130, input devices 1140, output devices 1150, and storage devices 1160 for general-purpose computers are well known to those skilled in the art, and will not be described in detail herein.

The simplified computing device of FIG. 11 may also include a variety of computer readable media. Computer readable media can be any available media that can be accessed by computer 1100 via storage devices 1160 and includes both volatile and nonvolatile media that is either removable 1170 and/or non-removable 1180, for storage of information such as computer-readable or computer-executable instructions, data structures, program modules, or other data. By way of example, and not limitation, computer readable media may comprise computer storage media and communication media.

Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Text Rectifier described herein, or portions thereof, may be stored, received, transmitted, or read from any desired combination of computer or machine readable media or storage devices and communication media in the form of computer executable instructions or other data structures.

Finally, the Text Rectifier described herein may be further described in the general context of computer-executable instructions, such as program modules, being executed by a computing device. Generally, program modules include routines, programs, objects, components, data structures, etc., that perform particular tasks or implement particular abstract data types.

The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The foregoing description of the Text Rectifier has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Text Rectifier. It is intended that the scope of the invention be limited not by this detailed description, but rather by the claims appended hereto.

What is claimed is:

1. A method for rectifying text in an image, comprising using a computing device to perform steps for:
    receiving a single input image;
    selecting a single region of the input image containing deformed text;
    iteratively processing the selected region using an iterative convex optimization process that models the selected region as a low-rank matrix and repeatedly estimates and updates transforms that would cause the deformation of the text in the modeled region until a rank of the matrix is minimized; and
    recovering a low-rank texture from the selected image region using the estimated transforms associated with the minimized rank to construct a low-rank texture version of the selected region from which the deformations have been removed from the text and wherein the text has been rectified to an upright position.

2. The method of claim 1 further comprising performing a binarization process on the selected image region prior to each iteration of the convex optimization process such that the selected region is modified to become white text on a black background.

3. The method of claim 2 wherein the binarization process further comprises:
    detecting a foreground portion of the selected region corresponding to the deformed text;
    setting the foreground to a white color; and
    setting a corresponding background portion of the selected image region to a black color.

4. The method claim 1 further comprising providing the low-rank texture version of the selected region to an OCR engine for recognizing the text in the low-rank texture version of the selected region.

5. The method of claim 1 wherein the deformation of the text includes deformation resulting from the text being on a curved surface, and wherein the iterative convex optimization process is adapted to model 3D geometry and curvature of surfaces in the selected image region.

6. The method of claim 1 wherein the deformations include one or more of affine transforms, projective transforms, rotations, translations, and curvatures.

7. The method of claim 1 wherein the iterative convex optimization process further uses an estimated sparse error component to estimate and update the transforms.

8. A system for modeling an image containing text as a low-rank texture in order to rectify the text, comprising:
    a general purpose computing device; and
    a computer program comprising program modules executable by the computing device, wherein the computing device is directed by the program modules of the computer program to:

receive a single input image;

select a single region of the input image containing deformed text;

perform binarization of the selected image region that makes the selected image region white text on a black background prior to performing each iteration of a convex optimization process;

iteratively process the selected region using the iterative convex optimization process that models the selected region as a low-rank matrix and repeatedly estimates and updates transforms that would cause the deformation of the text in the modeled region until a rank of the matrix is minimized; and recover a low-rank texture from the selected image region using the estimated transforms associated with the minimized rank to construct a low-rank texture version of the selected region from which the deformations have been removed from the text and wherein the text has been rectified to an upright position.

9. The system of claim 8 wherein the binarization of the selected image region further comprises:

detecting a foreground portion of the selected region corresponding to the deformed text;

setting the foreground to a white color; and setting a corresponding background portion of the selected image region to a black color.

10. The system of claim 8 further comprising providing the low-rank texture version of the selected region to an OCR engine for recognizing the text in the low-rank texture version of the selected region.

11. The system of claim 8 wherein the deformation of the text includes deformation resulting from the text being on a curved surface, and wherein the iterative convex optimization process is adapted to model 3D geometry and curvature of surfaces in the selected image region.

12. The system of claim 8 wherein the deformations include one or more of affine transforms, projective transforms, rotations, translations, and curvatures.

13. The system of claim 8 wherein the iterative convex optimization process further uses an estimated sparse error component to estimate and update the transforms.

14. A computer-readable storage device having computer executable instructions stored therein for extracting low-rank textural and geometric information and a sparse error component from an image, said instructions comprising:

receiving a single input image;

selecting a single region of the input image containing deformed text;

converting the selected image region to a binary image prior to performing each iteration of a convex optimization process;

iteratively processing the selected region using the iterative convex optimization process that models the selected region as a low-rank matrix and repeatedly estimates and updates transforms that would cause the deformation of the text in the modeled region until a rank of the matrix is minimized; and recovering a low-rank texture from the selected image region using the estimated transforms associated with the minimized rank to construct a low-rank texture version of the selected region from which the deformations have been removed from the text and wherein the text has been rectified to an upright position.

15. The computer-readable storage device of claim 14 wherein the binary image provides white text on a black background.

16. The computer-readable storage device of claim 15 wherein converting the selected image region to a binary image further comprises:

detecting a foreground portion of the selected region corresponding to the deformed text;

setting the foreground to a white color; and setting a corresponding background portion of the selected image region to a black color.

17. The computer-readable storage device of claim 14 further comprising providing the low-rank texture version of the selected region to an OCR engine for recognizing the text in the low-rank texture version of the selected region.

18. The computer-readable storage device of claim 14 wherein the deformation of the text includes deformation resulting from the text being on a curved surface, and wherein the iterative convex optimization process is adapted to model 3D geometry and curvature of surfaces in the selected image region.

19. The computer-readable storage device of claim 14 wherein the deformations include one or more of affine transforms, projective transforms, rotations, translations, and curvatures.

20. The computer-readable storage device of claim 14 wherein the iterative convex optimization process further uses an estimated sparse error component to estimate and update the transforms.

* * * * *